(12) United States Patent
Hang et al.

(10) Patent No.: US 12,200,521 B2
(45) Date of Patent: Jan. 14, 2025

(54) COMMUNICATION METHOD AND COMMUNICATIONS APPARATUS

(71) Applicant: HUAWEI TECHNOLOGIES CO., LTD., Guangdong (CN)

(72) Inventors: Haicun Hang, Shanghai (CN); Liuliu Ji, Shanghai (CN); Hongzhe Shi, Shenzhen (CN); Xiaoyan Bi, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 347 days.

(21) Appl. No.: 17/672,531

(22) Filed: Feb. 15, 2022

(65) Prior Publication Data

US 2022/0174524 A1 Jun. 2, 2022

Related U.S. Application Data

(63) Continuation of application No. PCT/CN2019/101133, filed on Aug. 16, 2019.

(51) Int. Cl.
*H04W 24/08* (2009.01)
*H04W 72/0446* (2023.01)
(Continued)

(52) U.S. Cl.
CPC ....... *H04W 24/08* (2013.01); *H04W 72/0446* (2013.01); *H04W 72/23* (2023.01); *H04W 72/563* (2023.01)

(58) Field of Classification Search
CPC ... H04L 1/1607; H04L 1/1832; H04L 5/0055; H04L 5/0094; H04W 24/08; H04W 72/0446; H04W 72/23; H04W 72/563
See application file for complete search history.

(56) References Cited

U.S. PATENT DOCUMENTS 10,411,866 B2\* 9/2019 Lee ................... H04W 72/0453
11,750,354 B2\* 9/2023 Matsumura ........... H04L 5/0042
455/452.2
(Continued)

FOREIGN PATENT DOCUMENTS

CN 108809524 A 11/2018
CN 110061816 A 7/2019
(Continued)

OTHER PUBLICATIONS

Huawei et al: "Summary of AI: 7.2.8.2 Enhancements on Multi-TRP/ Panel Transmission of Offline Discussion", 3GPP Draft; R1-1907706,May 16, 2019, pp. 1-66, XP051739989.
(Continued)

*Primary Examiner* — Eric Nowlin

(57) ABSTRACT

This disclosure provides a communication method to implement a function of a hybrid automatic repeat request (HARQ) feedback codebook in a multi-station scenario. A terminal device receives a configuration group identifier, determines a physical downlink shared channel (PDSCH) reception occasion corresponding to the configuration group identifier, and transmits feedback information of the PDSCH reception occasion based on the configuration group identifier corresponding to the PDSCH reception occasion and according to a predetermined rule of feedback sorting.

18 Claims, 5 Drawing Sheets

(51) Int. Cl.
*H04W 72/23* (2023.01)
*H04W 72/563* (2023.01)

(56) References Cited

U.S. PATENT DOCUMENTS

| | | | |
|---|---|---|---|
| 11,871,450 B2* | 1/2024 | Yang | H04L 1/1896 |
| 2017/0338932 A1* | 11/2017 | Lee | H04W 72/23 |
| 2018/0234954 A1* | 8/2018 | Takeda | H04W 28/04 |
| 2018/0241510 A1* | 8/2018 | Shen | H04L 1/18 |
| 2020/0359405 A1* | 11/2020 | Matsumura | H04L 1/1854 |
| 2021/0226759 A1* | 7/2021 | Takeda | H04L 1/1887 |
| 2021/0329684 A1* | 10/2021 | Yang | H04L 1/1685 |
| 2021/0410170 A1* | 12/2021 | Matsumura | H04L 5/0044 |
| 2022/0007404 A1* | 1/2022 | Gou | H04W 72/0446 |
| 2022/0094488 A1* | 3/2022 | Matsumura | H04L 5/0032 |
| 2022/0174524 A1* | 6/2022 | Hang | H04W 72/563 |
| 2022/0239445 A1* | 7/2022 | Yoshioka | H04L 5/0055 |
| 2022/0278779 A1* | 9/2022 | Mu | H04L 1/1896 |
| 2022/0294591 A1* | 9/2022 | Liu | H04L 5/0091 |
| 2022/0294667 A1* | 9/2022 | Ly | H04W 72/0446 |
| 2022/0321303 A1* | 10/2022 | Matsumura | H04L 5/0053 |
| 2023/0156701 A1* | 5/2023 | Lei | H04L 1/1861 370/329 |
| 2023/0299928 A1* | 9/2023 | Ling | H04L 1/1854 370/329 |

FOREIGN PATENT DOCUMENTS

| | | | | |
|---|---|---|---|---|
| CN | 110086579 A | | 8/2019 | |
| CN | 110086583 A | | 8/2019 | |
| CN | 111147208 B | * | 9/2023 | H04L 1/1812 |
| EP | 3876453 A1 | * | 9/2021 | H04L 1/1812 |
| JP | 2021514147 A | * | 6/2021 | |
| JP | 2023145455 A | * | 10/2023 | H04L 1/08 |
| JP | 2023145456 A | * | 10/2023 | H04L 1/08 |
| KR | 20210084606 A | * | 10/2021 | |
| WO | 2019144833 A1 | | 8/2019 | |
| WO | WO-2020088466 A1 | * | 5/2020 | H04L 1/1812 |
| WO | WO-2022194249 A1 | * | 9/2022 | H04L 1/00 |

OTHER PUBLICATIONS

3GPP TSG RAN WG1 #97,R1-1906029,Enhancements on Multi-TRP/panel transmission, Huawei, HiSilicon, Reno, USA, May 13-17, 2019, total 18 pages.
3GPP TS 38.212 V15.6.0 (Jun. 2019),3rd Generation Partnership Project; Technical Specification Group Radio Access Network;NR;Multiplexing and channel coding(Release 15), total 101 pages.
3GPP TSG RAN WG1 Meeting #96bis,R1-1905523,Enhancements on Multi-TRP/panel transmission, Huawei, HiSilicon, Xi'an, China, Apr. 8-12, 2019, total 22 pages.
3GPP TS 38.213 V15.6.0 (Jun. 2019),3rd Generation Partnership Project; Technical Specification Group Radio Access Network;NR;Physical layer procedures for control(Release 15), total 107 pages.
3GPP TS 38.214 V15.6.0 (Jun. 2019),3rd Generation Partnership Project; Technical Specification Group Radio Access Network;NR;Physical layer procedures for data(Release 15), total 105 pages.
3GPP TSG RAN WG1 #97,R1-1906224,Enhancements on multi-TRP/panel transmission, NTT DoComo, Inc,Reno, USA, May 13-17, 2019, total 32 pages.
Huawei, HiSilicon, Discussion on DRX with cross-COT HARQ feedback.3GPP TSG-RAN WG2 Meeting 106, Reno, Nevada, US, Apr. 13-May 17, 2019, R2-1907744, 7 pages.

* cited by examiner

COMMUNICATION METHOD AND COMMUNICATIONS APPARATUS

CROSS-REFERENCE TO RELATED APPLICATIONS

This application is a continuation of International Application No. PCT/CN2019/101133, filed on Aug. 16, 2019, the disclosure of which is hereby incorporated by reference in its entirety.

TECHNICAL FIELD

This disclosure relates to the field of wireless communications, and more specifically, to a communication method and a communications apparatus.

BACKGROUND

In a hybrid automatic repeat request-acknowledgment (HARQ-ACK) feedback mechanism, feedback sorting of a HARQ-ACK codebook in a single-station scenario is mainly focused on conventional technology. In a multi-station (multi-TPR) scenario, when different physical downlink shared channels (PDSCH) overlap in time domain resources, HARQ-ACK information of only one PDSCH is fed back in the conventional technology. How to feedback HARQ-ACK information of a plurality of PDSCHs in a multi-station scenario is an urgent problem that needs to be resolved.

SUMMARY

This disclosure provides a communication method and a communications apparatus, to implement a function of a hybrid automatic repeat request-acknowledgment (HARQ) feedback codebook in a multi-station scenario.

According to a first aspect, a communication method is provided. The method may be performed by a terminal device, or may be performed by a chip disposed in a terminal device. This is not limited in this disclosure.

The method provides a terminal device receives a configuration group identifier and determines a physical downlink shared channel (PDSCH) reception occasion corresponding to the configuration group identifier. The terminal device transmits (sends) feedback information of the PDSCH reception occasion based on the configuration group identifier corresponding to the PDSCH reception occasion and according to a predetermined rule of feedback sorting. The feedback information of the PDSCH reception occasion indicates feedback information of data transmission on a time-frequency resource corresponding to the PDSCH reception occasion.

The configuration group identifier is associated with the PDSCH reception occasion. Therefore, feedback information of PDSCH reception occasions in a multi-station scenario can be sorted based on the configuration group identifier and according to the predetermined sorting rule. Even if scheduling of PDSCHs by a plurality of stations overlaps in time domain resources, PDSCH reception occasions corresponding to different network devices can also be distinguished based on configuration group identifiers, to implement HARQ feedback for downlink data transmission in the multi-station scenario.

According to a second aspect, this disclosure provides a communication method. The method may be performed by a network device, or may be performed by a chip disposed in a network device. This is not limited in this disclosure.

The method includes transmitting (sending) a configuration group identifier to a terminal device, where the configuration group identifier corresponds to a physical downlink shared channel PDSCH reception occasion; and receiving feedback information that is of the PDSCH reception occasion and that is sent by the terminal device based on the configuration group identifier corresponding to the PDSCH reception occasion and according to a predetermined rule of feedback sorting.

The network device sends the configuration group identifier, and the configuration group identifier is associated with a PDSCH reception occasion. Therefore, feedback information of PDSCH reception occasions in a multi-station scenario can be sorted based on the configuration group identifier and according to the predetermined sorting rule. Even if scheduling of PDSCHs by a plurality of stations overlaps in time domain resources, PDSCH reception occasions corresponding to different network devices can also be distinguished based on configuration group identifiers, to receive a HARQ feedback for downlink data transmission in a multi-station scenario.

With reference to the first aspect or the second aspect, in some possible implementations, the configuration group identifier is at least one of the following: an ID or an index of a slot time sequence set, an ID or an index of a control resource set (CORESET), an ID or an index of a control resource set group (CORESET group), an ID or an index of a PDCCH configuration, or an index of a higher layer parameter.

With reference to the first aspect, in some possible implementations, the sending feedback information of the PDSCH reception occasion includes: sending, on an uplink resource corresponding to each configuration group identifier, feedback information of a PDSCH reception occasion corresponding to the configuration group identifier corresponding to the uplink resource.

With reference to the second aspect, in some possible implementations, the receiving feedback information that is of the PDSCH reception occasion and that is sent by the terminal device based on the configuration group identifier corresponding to the PDSCH reception occasion and according to a predetermined rule of feedback sorting includes: receiving, on an uplink resource corresponding to each configuration group identifier, feedback information that is of a PDSCH reception occasion corresponding to the configuration group identifier corresponding to the uplink resource and that is sent by the terminal device based on the configuration group identifier corresponding to the PDSCH reception occasion and according to the predetermined rule of the feedback sorting.

With reference to the first aspect, in some possible implementations, the uplink resource is determined based on the last piece of downlink control information (DCI) corresponding to the configuration group identifier corresponding to the uplink resource.

With reference to the second aspect, in some possible implementations, the uplink resource is configured based on the last piece of DCI corresponding to the configuration group identifier corresponding to the uplink resource.

With reference to the first aspect or the second aspect, in some possible implementations, the last piece of DCI is determined based on at least one of the following: PDCCH monitoring occasions or cell identifiers.

With reference to the first aspect, in some possible implementations, the sending feedback information of the PDSCH reception occasion includes: determining an uplink resource based on a configuration group identifier, and sending, on the determined uplink resource, feedback information of PDSCH reception occasions corresponding to all configuration group identifiers.

With reference to the second aspect, in some possible implementations, the receiving feedback information that is of the PDSCH reception occasion and that is sent by the terminal device based on the configuration group identifier corresponding to the PDSCH reception occasion and according to a predetermined rule of feedback sorting includes: determining an uplink resource based on the configuration group identifier, and receiving, on the determined uplink resource, feedback information that is of PDSCH reception occasions corresponding to all configuration group identifiers and that is sent by the terminal device based on the configuration group identifier corresponding to the PDSCH reception occasion and according to the predetermined rule of the feedback sorting.

With reference to the first aspect, in some possible implementations, the uplink resource is determined based on the last piece of downlink control information DCI in DCI corresponding to all configuration group identifiers corresponding to the uplink resource.

With reference to the second aspect, in some possible implementations, the uplink resource is configured based on the last piece of downlink control information DCI in DCI corresponding to all configuration group identifiers corresponding to the uplink resource.

With reference to the first aspect and the second aspect, in some possible implementations, the last piece of DCI is determined based on at least one of the following: physical downlink control channel PDCCH monitoring occasions, configuration group identifiers, or cell identifiers.

With reference to the first aspect or the second aspect, in some possible implementations, the rule of the feedback sorting includes: sorting based on at least one of the following: a number of a time domain unit in which the PDSCH reception occasion is located, a size of the configuration group identifier, or a size of a cell identifier corresponding to the PDSCH reception occasion.

With reference to the first aspect or the second aspect, in some possible implementations, the feedback information of the PDSCH reception occasion includes at least first feedback information and second feedback information, and a sequence of the first feedback information and the second feedback information corresponds to the feedback sorting.

According to a third aspect, a communication method is provided. The method may be performed by a terminal device, or may be performed by a chip disposed in a terminal device. This is not limited in this disclosure.

The method includes: receiving at least two configuration group identifiers; receiving at least two pieces of downlink control information DCI, where each piece of DCI is associated with one configuration group identifier, and the at least two pieces of DCI are each used to schedule a physical downlink shared channel PDSCH reception occasion fed back in a same uplink slot; and determining last piece of DCI in the at least two pieces of DCI based on the configuration group identifier, where an uplink resource indicated by the last piece of DCI is used to carry feedback information of the PDSCH reception occasion scheduled by using each piece of DCI.

With reference to the third aspect, in some possible implementations, the configuration group identifier is at least one of the following: an ID or an index of a slot time sequence set, an ID or an index of a control resource set (CORESET), an ID or an index of a control resource set group (CORESET group), an ID or an index of a PDCCH configuration, or an index of a higher layer parameter.

With reference to the third aspect, in some possible implementations, the last piece of DCI is determined based on at least one of the following: physical downlink control channel PDCCH monitoring occasions or cell identifiers.

Alternatively, in some possible implementations, the last piece of DCI is determined based on at least one of the following: physical downlink control channel PDCCH monitoring occasions, configuration group identifiers, or cell identifiers.

According to a fourth aspect, a communications apparatus is provided, and includes modules or units configured to perform the method in any possible implementation of the first aspect or the third aspect.

According to a fifth aspect, a communications apparatus is provided, and includes a processor. The processor is coupled to a memory, and may be configured to execute an instruction in the memory to implement the method in any possible implementation of the first aspect or the third aspect. Optionally, the communications apparatus further includes the memory. Optionally, the communications apparatus further includes a communications interface, and the processor is coupled to the communications interface.

In an implementation, the communications apparatus is a terminal device. When the communications apparatus is the terminal device, the communications interface may be a transceiver or an input/output interface.

In another implementation, the communications apparatus is a chip disposed in a terminal device. When the communications apparatus is the chip disposed in the terminal device, the communications interface may be an input/output interface.

Optionally, the transceiver may be a transceiver circuit. Optionally, the input/output interface may be an input/output circuit.

According to a sixth aspect, a communications apparatus is provided, and includes modules or units configured to perform the method in any possible implementation of the second aspect.

According to a seventh aspect, a communications apparatus is provided, and includes a processor. The processor is coupled to a memory, and may be configured to execute an instruction in the memory, to implement the method in any possible implementation of the second aspect. Optionally, the communications apparatus further includes the memory. Optionally, the communications apparatus further includes a communications interface, and the processor is coupled to the communications interface.

In an implementation, the communications apparatus is a network device. When the communications apparatus is the network device, the communications interface may be a transceiver, or an input/output interface.

In another implementation, the communications apparatus is a chip disposed in a network device. When the communications apparatus is the chip disposed in the network device, the communications interface may be an input/output interface.

Optionally, the transceiver may be a transceiver circuit. Optionally, the input/output interface may be an input/output circuit.

According to an eighth aspect, a processor is provided, and includes an input circuit, an output circuit, and a processing circuit. The processing circuit is configured to: receive a signal by using the input circuit, and transmit a signal by using the output circuit, so that the processor performs the method in any one of the first aspect, the second aspect, or the third aspect, or the possible implementations of the first aspect, the second aspect, or the third aspect.

In a specific implementation process, the processor may be a chip, the input circuit may be an input pin, the output circuit may be an output pin, and the processing circuit may be a transistor, a gate circuit, a trigger, various logic circuits, or the like. The input signal received by the input circuit may be received and input by, for example, but not limited to, a receiver. The signal output by the output circuit may be output to, for example, but not limited to, a transmitter and transmitted by the transmitter. The input circuit and the output circuit may be a same circuit, and the circuit is separately used as the input circuit and the output circuit at different moments. Specific implementations of the processor and the various circuits are not limited in this embodiment of this disclosure.

According to a ninth aspect, a processing apparatus is provided, and includes a processor and a memory. The processor is configured to: read an instruction stored in the memory, receive a signal via a receiver, and transmit a signal via a transmitter, to perform the method in any one of the first aspect, the second aspect, or the third aspect, or the possible implementations of the first aspect, the second aspect, or the third aspect.

Optionally, there are one or more processors and one or more memories.

Optionally, the memory may be integrated into the processor, or the memory and the processor may be separately disposed.

In a specific implementation process, the memory may be a non-transitory memory, for example, a read-only memory (ROM). The memory and the processor may be integrated on a same chip, or may be separately disposed on different chips. A type of the memory and a manner of disposing the memory and the processor are not limited in this embodiment of this disclosure.

It should be understood that a related data exchange process, for example, sending indication information, may be a process of outputting indication information from the processor, and receiving capability information may be a process of receiving input capability information by the processor. Specifically, data output by the processor may be output to the transmitter, and input data received by the processor may be from the receiver. The transmitter and the receiver may be collectively referred to as a transceiver.

The processing apparatus in the ninth aspect may be a chip. The processor may be implemented by using hardware or software. When the processor is implemented by using hardware, the processor may be a logic circuit, an integrated circuit, or the like. When the processor is implemented by using software, the processor may be a general-purpose processor, and is implemented by reading software code stored in a memory. The memory may be integrated into the processor, or may be located outside the processor, and exists independently.

According to a tenth aspect, a computer program product is provided. The computer program product includes a computer program (which may also be referred to as code or an instruction). When the computer program is run, a computer is enabled to perform the method according to any one of the possible implementations of the first aspect, the second aspect, or the third aspect.

According to an eleventh aspect, a computer-readable medium is provided. The computer-readable medium stores a computer program (which may also be referred to as code or an instruction). When the computer program is run on a computer, the computer is enabled to perform the method in any one of the possible implementations of the first aspect, the second aspect, or the third aspect.

According to a twelfth aspect, a communications system is provided, including the foregoing network device and the foregoing terminal device.

DESCRIPTION OF EMBODIMENTS

Figure 1:
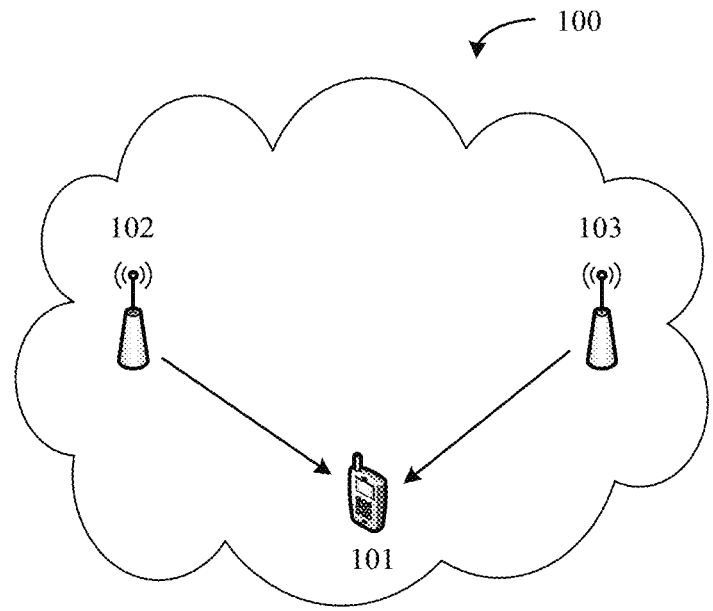
FIG. 1 is a schematic diagram of a communications system in which is used a communication method according to an embodiment of this disclosure.

The following describes technical solutions of this disclosure with reference to the accompanying drawings.

The technical solutions of embodiments of this disclosure may be used in various communications systems such as a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a 5th generation (5G) system, or a new radio (NR) system.

It should be understood that a network device in the communications system may be any device having a wireless transceiver function or a chip that may be disposed in the device. The device includes but is not limited to an evolved NodeB (eNB), a radio network controller (RNC), a NodeB (Node B, NB), a base station controller (BSC), a base transceiver station (BTS), a home base station (for example, a Home evolved NodeB, or a Home Node B, HNB), a baseband unit (BBU), an access point (AP) in a wireless fidelity (WIFI) system, a wireless relay node, a wireless backhaul node, a transmission point (TP), a transmission reception point (TRP), or the like, or may be a gNB or a transmission point (TRP or TP) in a 5G system, for example, an NR system, or one antenna panel or a group of antenna panels (including a plurality of antenna panels) of a base station in a 5G system, or may be a network node, for example, a baseband unit (BBU) or a distributed unit (DU), that constitutes a gNB or a transmission point.

In some deployments, the gNB may include a centralized unit (CU) and the DU. The gNB may further include a radio unit (RU). The CU implements a part of functions of the gNB, and the DU implements a part of the functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information at the RRC layer eventually becomes information at the PHY layer, or is converted from information at the PHY layer. Therefore, in the architecture, higher layer signaling, such as RRC layer signaling or PHCP layer signaling, may also be considered as being sent by the DU or sent by the DU and the RU. It may be understood that the network device may be a CU node, a DU node, or a device including a CU node and a DU node. In addition, the CU may be classified as a network device in an access network RAN, or the CU may be classified as a network device in a core network CN. This is not limited herein.

It should be further understood that a terminal device in the communications system may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device in the embodiments of this disclosure may be a mobile phone, a tablet computer (Pad), a computer with a wireless transceiver function, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. An disclosure scenario is not limited in the embodiments of this disclosure.

For ease of understanding the embodiments of this disclosure, the following briefly describes several terms that are in this disclosure.

1. A Cell may also be referred to as a serving cell. The cell may be understood as being described by a higher layer from a perspective of resource management, mobility management, or a service unit. Coverage of each network device may be divided into one or more serving cells, and the serving cells may be considered to include a specific frequency domain resource. In the embodiments of this disclosure, the cell may be replaced with a serving cell or a carrier unit (component carrier, CC, or referred to as a component carrier, a component carrier, a carrier, or the like). In the embodiments of this disclosure, terms "cell", "serving cell", and "CC" are used alternatively, and meanings expressed by the terms are consistent when differences between the terms are not emphasized.

It should be noted that the cell may be an area within coverage of a wireless network of a network device. In the embodiments of this disclosure, different cells may correspond to different network devices. For example, a network device in a cell #1 and a network device in a cell #2 may be different network devices, for example, base stations. That is, the cell #1 and the cell #2 may be managed by different base stations. In this case, the cell #1 and the cell #2 may be referred to as not being deployed at a collaborated site or a same site. The network device in the cell #1 and the network device in the cell #2 may also be different radio frequency processing units, for example, radio remote units (RRU), of a same base station. In other words, the cell #1 and the cell #2 may be managed by a same base station that has a same baseband processing unit and a same intermediate frequency processing unit, but has different radio frequency processing units. This is not specifically limited in this disclosure.

A terminal device may obtain a cell identifier in advance. The network device may indicate the cell identifier to the terminal device by using higher layer signaling. For example, the terminal device may obtain the cell identifier in a downlink synchronization process. A specific method for obtaining the cell identifier by the terminal device is not limited in this disclosure.

2. A control resource set (CORESET) may be a resource set used to transmit downlink control information (DCI), or may be referred to as a control resource area or a physical downlink control channel resource set.

For a network device, the control resource set may be understood as a set of resources that may be used to send a physical downlink control channel (PDCCH). For a terminal device, a resource corresponding to a PDCCH search space of each terminal device is in the control resource set. In other words, the network device may determine, in the control resource set, one resource used to send the PDCCH, and the terminal device may determine the PDCCH search space based on the control resource set.

The control resource set may include a time-frequency resource. For example, the control resource set may be a segment of bandwidth or one or more sub-bands in frequency domain, and the control resource set may be one or more symbols in time domain. A control resource set may be consecutive or nonconsecutive resource elements in time domain and frequency domain, for example, consecutive resource blocks (RB) or nonconsecutive RBs.

3. Uplink-downlink configuration: For time division duplex (TDD), an RRC parameter TDD-UL-DL-SlotConfig is defined to indicate which slots are all downlink symbols, which slots are all uplink symbols, and which slots include both uplink symbols and downlink symbols. For frequency division duplex (FDD), simultaneous uplink and downlink transmission may be supported.

4. A HARQ-ACK codebook (which may also be referred to as a HARQ feedback codebook) is a combination of acknowledgment (ACK) information and/or negative acknowledgment (NACK) information that are/is fed back by a terminal device to a network device after the terminal device decodes a received PDSCH. The HARQ-ACK codebook mainly includes a semi-persistent codebook and a dynamic codebook that are selected based on RRC signaling. The semi-persistent codebook is a HARQ-ACK codebook generation manner in which a size of the HARQ-ACK codebook does not dynamically change with an actual data scheduling status. In this manner, the size of the HARQ-ACK codebook is determined based on a predefined or RRC configured parameter. The dynamic codebook is a HARQ-ACK codebook generation manner in which the size of the HARQ-ACK codebook dynamically changes with the actual data scheduling status. Optionally, the codebook may be represented in a form of a plurality of bit information bits.

5. PDSCH reception occasion: For each downlink slot, there is a possibility of PDSCH transmission. For each downlink slot, a PDSCH reception occasion is determined based on a time domain resource allocation list (for example, a list, denoted as R, whose element each represents a PDSCH time domain resource allocation manner that is represented by R and that is configured by using higher layer signaling such as RRC). There may be an allocation manner in which PDSCH time domain resource allocation manners completely or partially overlap in time domain resources. The following describes a process of marking the PDSCH reception occasion in detail. For each downlink slot, in a time domain resource allocation manner in R, if a symbol in the time domain resource is configured as an uplink symbol, it indicates that a PDSCH cannot be transmitted in the time domain resource allocation manner. In this case, the time domain resource allocation manner that includes the symbol configured as the uplink symbol is removed from R, to ensure that all remaining time domain resources in R can be used to transmit the PDSCH. Further, when the terminal device does not support transmission of a plurality of PDSCHs in one downlink slot, and R is not empty, all time domain resource allocation manners are marked as a same candidate PDSCH reception occasion. When the terminal device supports transmission of a plurality of PDSCHs in one downlink slot, for time domain resources that are in R and that can be used to transmit the PDSCHs, a time domain resource allocation manner A in which time domain resource allocation ends earliest is first found, and is marked as a candidate PDSCH reception occasion j. If there is a time domain resource allocation manner that is in R and that completely or partially overlap A in time domain, the time domain resource allocation manner is also marked as the PDSCH reception occasion j. In this case, a PDSCH reception occasion corresponds to a group of time domain resources that are marked as a same PDSCH reception occasion. The marked time domain resources are removed from R, and the process of determining a PDSCH reception occasion is repeated for remaining time domain resources in R until R is empty.

6. A slot time sequence set (K1 set) is a set of possible values of a slot offset K1 between a physical downlink shared channel (PDSCH) and a PUCCH that carries HARQ-ACK information feedback corresponding to the PDSCH. A quantity of slots corresponding to the K1 parameter is determined based on a configuration parameter corresponding to the PUCCH or the PUSCH. A K1 set includes at least one K1 set value. The K1 set is a set of possible values of K1 predefined by a base station or configured by the base station based on RRC parameter data to an uplink slot offset value of an ACK (dl-DataToUL-ACK). Downlink control information DCI includes time sequence indication information used to indicate a slot offset between a PDSCH and HARQ feedback. The slot time sequence set in the following expression is represented by K1 set.

7. HARQ-ACK window: A network device obtains, through calculation based on an uplink slot, a K1 set, and uplink and downlink subcarrier spacings, a plurality of time domain units that carry PDSCH reception occasions and that correspond to the uplink slot, and the plurality of time domain units are referred to as HARQ-ACK windows corresponding to the uplink slot. An example is used for description: When the uplink and downlink subcarrier spacings are the same, for each uplink slot, a K1 value in the K1 set is subtracted from a number of the uplink slot in descending order of K1 values in the K1 set, to obtain numbers of downlink slots in which the PDSCH reception occasions corresponding to the uplink slot are located, that is, to obtain the HARQ-ACK windows corresponding to the uplink slot. For example, when the K1 set={2,3,4}, HARQ-ACK windows corresponding to an uplink slot whose slot number is slot 4 are downlink slots: slot 0, slot 1, and slot 2, and HARQ-ACK windows corresponding to an uplink slot whose slot number is slot 6 are downlink slots: slot 2, slot 3, and slot 4.

8. In the embodiments of this disclosure, configuration group identifiers are used to group configurations (config) associated with the configuration group identifiers. For example, configurations corresponding to different network devices may be distinguished based on configuration group identifiers associated with the configurations. That is, different configuration group identifiers may correspond to the different network devices. In other words, a terminal device may transmit information with the different network devices based on the configurations corresponding to the different configuration group identifiers. It should be noted that, in the embodiments of this disclosure, a representation form of one configuration group identifier is not only limited to one index or one identifier (ID). The configuration group identifiers may also be represented by using different configurations. For example, different K1 sets may also be used as different configuration group identifiers, and configurations associated with the different K1 sets are divided into different groups.

9. A PDCCH monitoring occasion is determined based on a control resource set CORESET and a search space SS that are configured based on RRC signaling. A start symbol position for DCI blind detection is determined in the search space, and a symbol length of the DCI blind detection is determined in the CORESET, to determine the PDCCH monitoring occasion. In addition, for ease of understanding the embodiments of this disclosure, the following descriptions are provided.

First, in this disclosure, for ease of description, when numbering is involved, consecutive numbering may start from 0. For example, the $0^{th}$ symbol in a slot may be an initial symbol in the slot. Certainly, a specific implementation is not limited thereto. For example, consecutive numbering may alternatively start from 1. For example, the first symbol in a slot may also be an initial symbol in the slot. Because start values of numbers are different, numbers corresponding to a same symbol in a slot are also different.

It should be understood that the foregoing descriptions are all provided for ease of describing the technical solutions provided in the embodiments of this disclosure, but are not intended to limit the scope of this disclosure.

Second, the terms "first", "second", and various numbers in the following embodiments are merely used for differentiation for ease of description, and are not used to limit the scope of the embodiments of this disclosure. For example, the numbers are used to distinguish different PUCCHs, different PDSCH reception occasions, and the like.

Third, "at least one" indicates one or more, and "a plurality of" indicates two or more. The term "and/or" describes an association relationship between associated objects and represents that three relationships may exist. For example, A and/or B may represent the following three cases: Only A exists, both A and B exist, and only B exists. The A and the B may be singular or plural. The character "/" usually indicates an "or" relationship between the associated objects. "At least one of the following items (pieces)" or a similar expression thereof indicates any combination of these items, including a single item (piece) or any combination of a plurality of items (pieces). For example, at least one of a, b, and c may represent: a, b, c, a and b, a and c, b and c, or a, b, and c, where a, b, and c each may be singular or plural.

For ease of understanding the embodiments of this disclosure, a communications system shown in FIG. 1 is used as an example to describe in detail a communications system in which a communication method provided in the embodiments of this disclosure is used. FIG. 1 is a schematic diagram of a communications system 100 in which a communication method according to an embodiment of this disclosure is used. As shown in the figure, the communications system 100 may include at least one terminal device such as a terminal device 101 shown in the figure. The communications system 100 may further include at least one network device, such as a network device #1 102 or a network device #2 103 shown in the figure.

Optionally, the communications system 100 may include one or more network devices such as the network device #1 102 and the network device #2 103 that are shown in the figure. The network device #1 102 and the network device #2 103 may be network devices in a same cell, or may be network devices in different cells. This is not limited in this disclosure. The figure is merely an example, and shows an example in which the network device #1 102 and the network device #2 103 are located in the same cell.

In the communications system 100, the terminal device separately feeds back acknowledgment (ACK) information and/or negative acknowledgment (NACK) information corresponding to PDSCHs sent by different network devices to the corresponding network devices.

In this embodiment of this disclosure, a physical downlink shared channel PDSCH reception occasion associated with a configuration group identifier is proposed. UE determines, based on a configuration group identifier sent by the network device, a physical downlink shared channel PDSCH reception occasion corresponding to the configuration group identifier. The UE calculates PDSCH reception occasions based on different configuration group identifiers, sorts the PDSCH reception occasions according to a preset sorting rule, and sends HARQ-ACK information corresponding to the PDSCH reception occasions. Optionally, the configuration group identifier is at least one of an ID or an index of a slot time sequence set, an ID or an index of a control resource set (CORESET), an ID or an index of a control resource set group (CORESET group), an ID or an index of a PDCCH configuration, or an index of a higher layer parameter.

Figure 2:
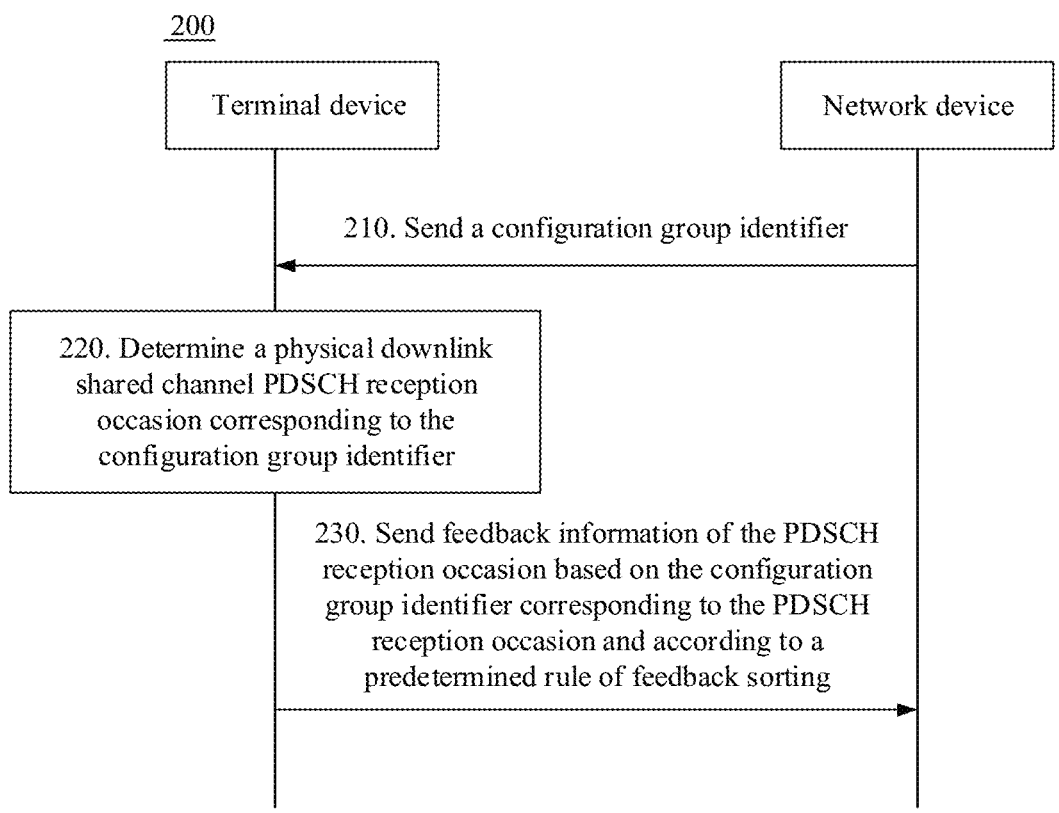
FIG. 2 is a schematic flowchart of a communication method 200 from a perspective of device interaction according to an embodiment of this disclosure.

FIG. 2 is a schematic flowchart of a communication method 200 from a perspective of device interaction according to an embodiment of this disclosure. As shown in the figure, the method 200 may include operation 210 to operation 230. The following describes the operations in the method 200 in detail.

It should be noted that the communication method provided in this disclosure may be used in a wireless communications system such as the communications system 100 shown in FIG. 1. There may be a wireless communication connection relationship between communications apparatuses in a communications system. For example, as shown in FIG. 1, the terminal device 101 may separately have a wireless communication connection relationship with the network device #1 102 and the network device #2 103. This is not limited in this disclosure.

In operation 210, a network device sends a configuration group identifier to a terminal device. The terminal device receives the configuration group identifier from the network device.

Optionally, the configuration group identifier may be at least one of an ID or an index (uniformly denoted as a K1 set ID below) of a slot time sequence set, an ID or an index (uniformly denoted as a CORESET ID below) of a control resource set (CORESET), an ID or an index (uniformly denoted as a CORESET group ID below) of a control resource set group (CORESET group), an ID or an index (uniformly denoted as a PDCCH config ID below) of a PDCCH configuration (PDCCH config), or an index of a higher layer parameter. The index of the higher layer parameter may be an index of a higher layer parameter carried in a control resource set, a control resource set group, and a configuration such as the PDCCH config. Different configuration group identifiers are associated with different network devices, and the configuration group identifiers may be respectively sent to the terminal device by the network devices corresponding to the configuration group identifiers, or may be sent to the terminal device by any one of a plurality of network devices.

In operation 220, the terminal device determines a PDSCH reception occasion corresponding to the configuration group identifier.

That the terminal device calculates a PDSCH reception occasion based on each configuration group identifier includes: The terminal device calculates, based on different configuration group identifiers, PDSCH reception occasions corresponding to the different configuration group identifiers.

When a plurality of K1 sets are configured for the terminal device, and the configuration group identifier is a K1 set ID, it is assumed that there are two different configuration group identifiers: K1 set-a and K1 set-b. When determining a PDSCH reception occasion corresponding to the K1 set-a, the terminal device may perform calculation based on all K1 values in a K1 set associated with the K1 set-a. When determining a PDSCH reception occasion corresponding to the K1 set-b, the terminal device may perform calculation based on all K1 values in a K1 set associated with the K1 set-b. For another example, when the configuration group identifiers are different CORESET IDs, CORESET group IDs, PDCCH config IDs, or indexes of higher layer parameters, when determining the PDSCH reception occasion corresponding to each configuration group identifier, the terminal device may perform calculation based on all K1 values in a K1 set associated with the configuration group identifier.

Further, an example in which the terminal device determines a corresponding PDSCH reception occasion for a configuration group identifier is used. The terminal device calculates, based on all K1 values in a K1 set associated with the configuration group identifier, HARQ-ACK windows corresponding to an uplink slot, and then determines a PDSCH reception occasion in each downlink slot in the HARQ-ACK windows based on a time domain resource allocation list. In this way, the terminal device determines the PDSCH reception occasion corresponding to the configuration group identifier.

When one K1 set is configured for the terminal device, when the configuration group identifiers are different CORESET IDs, CORESET group IDs, PDCCH config IDs, or indexes of higher layer parameters, the terminal device also needs to determine the PDSCH reception occasion corresponding to each configuration group identifier. The terminal device may calculate, based on all K1 values in the K1 set, HARQ-ACK windows corresponding to an uplink slot, and then may determine a PDSCH reception occasion in each downlink slot in the HARQ-ACK windows based on a time domain resource allocation list. Because there is only one K1 set, it is equivalent to a case in which the PDSCH reception occasion calculated based on the K1 set is the same for each corresponding configuration group identifier.

In operation 230, the terminal device sends feedback information of the PDSCH reception occasion based on the configuration group identifier corresponding to the PDSCH reception occasion and according to a predetermined rule of feedback sorting. The network device receives the feedback information of the PDSCH reception occasion.

Optionally, in different feedback manners, there may be one or more network devices that receive the feedback information, which is described in detail when the different feedback manners are described below, and details are not described herein.

Optionally, in different feedback manners, there may be one or more network devices that send the configuration group identifier, which is described in detail when the different feedback manners are described below, and details are not described herein.

Optionally, the rule of the feedback sorting includes: sorting based on at least one of the following: a number of a time domain unit in which the PDSCH reception occasion is located, a size of the configuration group identifier, or a size of a cell identifier corresponding to the PDSCH reception occasion. Details are described below.

The feedback information in this embodiment is in a form of a semi-persistent codebook (to be specific, a size of the feedback information does not dynamically change with an actual data scheduling status). The terminal device may send the feedback information of the PDSCH reception occasion to the network device in two manners: separate feedback for different network devices, and joint feedback for different network devices.

A separate feedback manner:

Optionally, that the terminal device sends feedback information of the PDSCH reception occasion to the network device includes: sending, on an uplink resource corresponding to each configuration group identifier, feedback information of a PDSCH reception occasion associated with the configuration group identifier corresponding to the uplink resource. For example, it is assumed that there are configuration group identifiers A and B. Feedback information of a PDSCH reception occasion corresponding to A is feedback information A, feedback information of a PDSCH reception occasion corresponding to B is feedback information B, an uplink resource corresponding to A is an uplink resource A, and an uplink resource corresponding to B is an uplink resource B. In this case, the terminal device sends the feedback information A on the uplink resource A, and sends the feedback information B on the uplink resource B, respectively.

The terminal device determines a corresponding PDSCH reception occasion for an uplink slot. The terminal device further needs to determine, based on an indication of downlink control information DCI, uplink resources used for uplink transmission, and sends, on the uplink resource corresponding to each configuration group identifier, the feedback information of the PDSCH reception occasion associated with the configuration group identifier corresponding to the uplink resource. For example, if the configuration group identifier is a CORESET group ID, a time-frequency resource of downlink control information DCI associated with the CORESET group ID may be used as a first time-frequency resource, and an uplink resource scheduled by using the DCI transmitted on the first time-frequency resource is an uplink resource corresponding to the configuration group identifier. If the configuration group identifier is a CORESET ID and/or a PDCCH config ID, an uplink resource indicated by DCI transmitted on a PDCCH corresponding to the configuration group identifier is an uplink resource corresponding to the configuration group identifier. If the configuration group identifier is a K1 set ID, an uplink resource indicated by DCI transmitted on a PDCCH corresponding to a CORESET ID, a CORESET group ID, or a PDCCH config ID associated with the configuration group identifier is an uplink resource corresponding to the configuration group identifier.

The terminal device determines, based on the indication of the downlink control information DCI, the uplink resource used for the uplink transmission. The downlink control information DCI is the last piece of DCI. Optionally, the terminal device determines a selected PUCCH resource set based on a size of uplink control information (UCI) bit information, and then selects, based on a PUCCH resource indicator field in the last piece of DCI, a PUCCH resource in the determined PUCCH resource set as the uplink resource for the uplink transmission. The last piece of DCI is determined based on at least one of cell identifiers or PDCCH monitoring occasions. Different configuration group identifiers correspond to different last pieces of DCI.

In the separate feedback manner, a rule for determining the last piece of DCI may be:

1. When the network device configures a cell for the terminal device, in PDCCH monitoring occasions corresponding to a same configuration group identifier, a PDCCH monitoring occasion with the latest start symbol position is the latest PDCCH monitoring occasion corresponding to the configuration group identifier, and the last piece of DCI is determined in the latest PDCCH monitoring occasion corresponding to the configuration group identifier.

For example, in PDCCH monitoring occasions corresponding to a same configuration group identifier, the terminal device determines a PDCCH monitoring occasion with the latest start symbol position as the latest PDCCH monitoring occasion. Specifically, in different PDCCH monitoring occasions (for example, two PDCCH monitoring occasions: a PDCCH monitoring occasion 0 and a PDCCH monitoring occasion 1) corresponding to a same configuration group identifier, a start symbol position of the PDCCH monitoring occasion 0 is the first symbol, and a symbol length occupied by the PDCCH monitoring occasion 0 is two symbols; a start symbol position of the PDCCH monitoring occasion 1 is the third symbol, and a symbol length occupied by the PDCCH monitoring occasion 1 is three symbols. Because the start symbol position of the PDCCH monitoring occasion 1 is the latest, the PDCCH monitoring occasion 1 is the latest PDCCH monitoring occasion.

Optionally, if only one piece of DCI can be sent to one user on each of different PDCCH monitoring occasions, DCI detected on the latest PDCCH monitoring occasion is the last piece of DCI. For example, it is assumed that the PDCCH monitoring occasion 1 is determined as the latest PDCCH monitoring occasion. If DCI detected on the PDCCH monitoring occasion 0 is DCI 0, and DCI detected on the PDCCH monitoring occasion 1 is DCI 1, the DCI 1 is determined as the last piece of DCI.

Optionally, the latest PDCCH monitoring occasion corresponding to the configuration group identifier may include a plurality of pieces of DCI, and the last piece of DCI is DCI with the latest start symbol position in all DCI detected on the latest PDCCH monitoring occasion. For example, it is assumed that the PDCCH monitoring occasion 1 is the determined latest PDCCH monitoring occasion. If DCI detected on the PDCCH monitoring occasion 0 is DCI 0 and DCI 2, DCI detected on the PDCCH monitoring occasion 1 is DCI 1 and DCI 3, and a start symbol position of the DCI 3 is the latest in the DCI 1 and the DCI 3 that are detected on the PDCCH monitoring occasion 1, the DCI 3 is determined as the last piece of DCI.

2. When the network device configures a plurality of cells for the terminal device and the plurality of cells can simultaneously serve the terminal device, different DCI may be sent to the terminal device in different cells, and different DCI corresponds to different cells. The detected DCI is sorted based on a sequence of PDCCH monitoring occasions in a configuration group identifier and cell identifier values, to determine the last piece of DCI corresponding to the configuration group identifier. Preferably, there are two different solutions: a solution 1 and a solution 2.

Solution 1: A PDCCH monitoring occasion that has the latest start symbol position and that corresponds to a same configuration group identifier is determined as the latest PDCCH monitoring occasion. Based on corresponding cell identifier values, in DCI detected on the latest PDCCH monitoring occasion, DCI corresponding to the largest cell identifier value is determined as the last piece of DCI corresponding to the configuration group identifier.

For example, the terminal device determines the PDCCH monitoring occasion that has the latest start symbol position and that corresponds to the same configuration group identifier as the latest PDCCH monitoring occasion. Details have been described in the foregoing embodiment, and details are not described herein again.

Optionally, if one piece of DCI can be sent to one user in each cell on one PDCCH monitoring occasion, in the DCI detected on the latest PDCCH monitoring occasion, the DCI corresponding to the largest cell identifier value is the last piece of DCI corresponding to the configuration group identifier. For example, it is assumed that a PDCCH monitoring occasion 1 is the determined latest PDCCH monitoring occasion, and the PDCCH monitoring occasion 1 corresponds to a plurality of cells (for example, three cells: a CC 0, a CC 1, and a CC 2). Assuming that an identifier value of the CC 2 is "2", an identifier value of the CC 1 is "1", and an identifier value of the CC 0 is "0", the identifier value of the CC 2 is greater than the identifier value of the CC 1, and the identifier value of the CC 1 is greater than the identifier value of the CC 0. DCI 0 is sent in the CC 0, DCI 1 is sent in the CC 1, and DCI 2 is sent in the CC 2. In this case, the DCI 2 sent in the CC 2 is determined as the last piece of DCI corresponding to the configuration group identifier.

Optionally, if more than one piece of DCI can be sent to one user in each cell on one PDCCH monitoring occasion, in all DCI detected on the latest PDCCH monitoring occasion, the DCI corresponding to the largest cell identifier value is first determined. In the DCI corresponding to the largest cell identifier value, DCI with the latest start symbol position is determined as the last piece of DCI corresponding to the configuration group identifier. For example, it is assumed that a PDCCH monitoring occasion 1 is the determined latest PDCCH monitoring occasion, and the PDCCH monitoring occasion 1 corresponds to a plurality of cells (for example, two cells: a CC 0 and a CC 1). It is assumed that an identifier value of the CC 1 is greater than an identifier value of the CC 0. DCI 0 and DCI 2 are sent in the CC 0, and DCI 1, DCI 3, and DCI 5 are sent in the CC 1. In the CC 1, a start symbol position of the DCI 5 is the latest. In this case, the DCI 5 is determined as the last piece of DCI corresponding to the configuration group identifier.

Solution 2: In DCI corresponding to a same configuration group identifier, DCI corresponding to the largest cell identifier value is first determined based on cell identifier values, PDCCH monitoring occasions on which the determined DCI is located are then sorted, and DCI detected on the latest PDCCH monitoring occasion is determined as the last piece of DCI corresponding to the configuration group identifier.

Optionally, in the PDCCH monitoring occasions corresponding to the determined DCI, if only one piece of DCI can be sent to one user on one PDCCH monitoring occasion, the DCI detected on the latest PDCCH monitoring occasion is the last piece of DCI corresponding to the configuration group identifier. In an example, two cells (a CC 0 and a CC 1) are used as an example. It is assumed that an identifier value of the CC 0 is "0", an identifier value of the CC 1 is "1", and the identifier value of the CC 1 is greater than the identifier value of the CC 0. In this case, it is determined that a cell with the largest cell identifier value is the CC 1. A plurality of pieces of DCI sent in the CC 1 correspond to a plurality of PDCCH monitoring occasions (for example, two PDCCH monitoring occasions: a PDCCH monitoring occasion 0 and a PDCCH monitoring occasion 1). DCI detected on the PDCCH monitoring occasion 0 is DCI 0, and DCI detected on the PDCCH monitoring occasion 1 is DCI 1. Assuming that the PDCCH monitoring occasion 1 is the determined latest PDCCH monitoring occasion, the DCI 1 detected on the PDCCH monitoring occasion 1 is determined as the last piece of DCI corresponding to the configuration group identifier.

Optionally, in the PDCCH monitoring occasions corresponding to the determined DCI, if more than one piece of DCI can be sent to one user on one PDCCH monitoring occasion, DCI that has the latest start symbol position and that is detected on the latest PDCCH monitoring occasion is determined as the last piece of DCI corresponding to the configuration group identifier. In an example, two cells (a CC 0 and a CC 1) are used as an example. It is assumed that an identifier value of the CC 0 is "0", an identifier value of the CC 1 is "1", and the identifier value of the CC 1 is greater than the identifier value of the CC 0. In this case, it is determined that a cell with the largest cell identifier value is the CC 1. A plurality of pieces of DCI sent in the CC 1 correspond to a plurality of PDCCH monitoring occasions (for example, two PDCCH monitoring occasions: a PDCCH monitoring occasion 0 and a PDCCH monitoring occasion 1). DCI detected on the PDCCH monitoring occasion 0 is DCI 0 and DCI 2, and DCI detected on the PDCCH monitoring occasion 1 is DCI 1 and DCI 3. Assuming that the PDCCH monitoring occasion 1 is the determined latest PDCCH monitoring occasion, and a start symbol position of the DCI 3 is the latest in the DCI 1 and the DCI 3 that are detected on the PDCCH monitoring occasion 1, the DCI 3 is determined as the last piece of DCI corresponding to the configuration group identifier.

For the separate feedback, the feedback information may be fed back to different TRPs, or may be fed back to one TRP (for example, a TRP of a primary cell that provides a service for the UE). Further optionally, the TRP forwards the feedback information to the TRP corresponding to each piece of feedback information. This is not limited in this embodiment.

In the separate feedback manner, the rule of the feedback sorting may be:

When the network device configures a cell for the terminal device, the terminal device first calculates a PDSCH reception occasion for each configuration group identifier, and maps, on an uplink resource corresponding to the configuration group identifier, feedback information of the PDSCH reception occasion associated with the configuration group identifier to a HARQ feedback codebook based on a sequence (which is, for example, a sequence of PDSCH reception occasions that is calculated based on an end time of PDSCH time domain resource allocation and an overlapping status of allocation manners of time domain resources in the foregoing description of the PDSCH reception occasion; or may be equivalent to a sequence of PDSCH reception occasions in time domain) obtained according to a method for calculating a PDSCH reception occasion. The terminal device then feeds back the feedback information to the network device.

Figure 3:
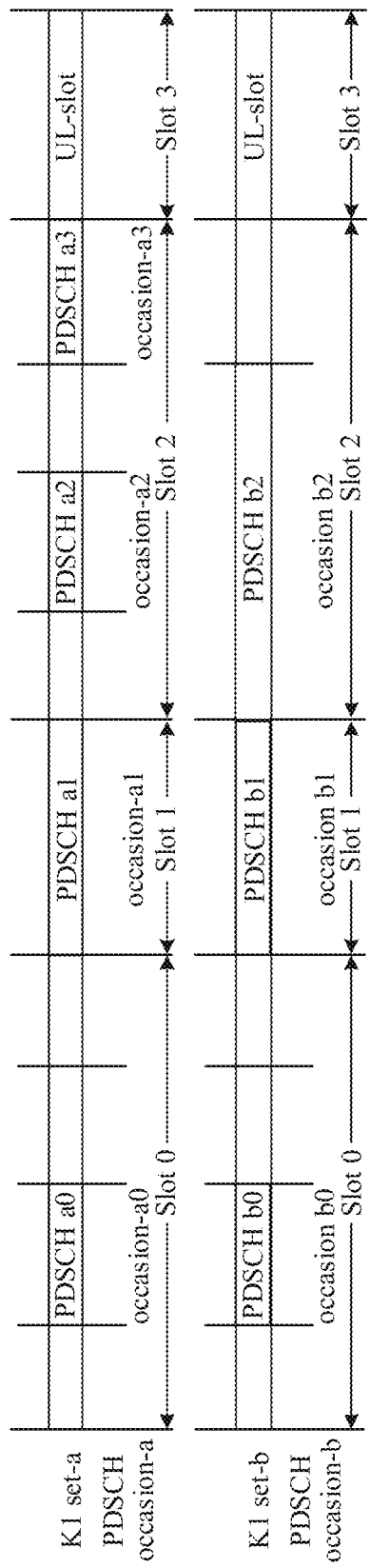
FIG. 3 is a schematic diagram of sorting PDSCH reception occasions in different slots of a plurality of stations according to an embodiment of this disclosure.

For example, that the terminal device calculates a PDSCH reception occasion based on each configuration group identifier includes: The terminal device calculates different PDSCH reception occasions based on different configuration group identifiers. For example, when a configuration group identifier is a K1 set identifier, it is assumed that there are two different configuration group identifiers: a configuration group identifier K1 set-a and a configuration group identifier K1 set-b. When the configuration group identifier is the K1 set-a, when a PDSCH reception occasion corresponding to the configuration group identifier is calculated, a PDSCH occasion-a may be calculated based on all K1 values in the K1 set-a, as shown in FIG. 3. When the configuration group identifier is the K1 set-b, when a PDSCH reception occasion corresponding to the configuration group identifier is calculated, a PDSCH occasion-b may be calculated based on all K1 values in the K1 set-b, as shown in FIG. 3. For another example, when the configuration group identifier is a CORESET ID, a CORESET group ID, a PDCCH config ID, or an index of a higher layer parameter included in a CORESET, and only one K1 set is configured, PDSCH reception occasions calculated based on different configuration group identifiers are the same, and may also be denoted as a PDSCH occasion-a and a PDSCH occasion-b, where the PDSCH occasion-a and the PDSCH occasion-b are the same. In the PDSCH occasion-a, according to the method for calculating a PDSCH reception occasion, it is known that the PDSCH occasion-a may include a plurality of PDSCH reception occasions, for example, an occasion-a0, an occasion-a1, an occasion-a2, and an occasion-a3. Similarly, the PDSCH occasion-b may include a plurality of PDSCH reception occasions, for example, an occasion-b0, an occasion-b1, and an occasion-b2.

The feedback information of the PDSCH reception occasion associated with each configuration group identifier includes at least first feedback information and second feedback information, and a sequence of the first feedback information and the second feedback information corresponds to the feedback sorting. The feedback information is sorted as follows: The first feedback information is ranked before the second feedback information, where a number of a time domain unit (for example, a slot) in which a PDSCH reception occasion corresponding to the first feedback information is located is less than a number of a time domain unit in which a PDSCH reception occasion corresponding to the second feedback information is located. Further optionally, in a same time domain unit, a start position of a downlink OFDM symbol occupied by the PDSCH reception occasion corresponding to the first feedback information is earlier than a start position of a downlink OFDM symbol occupied by the PDSCH reception occasion corresponding to the second feedback information.

For example, as shown in FIG. 3, the PDSCH occasion-a associated with one configuration group identifier is used as an example. It is assumed that the first feedback information corresponds to the PDSCH reception occasion occasion-a0, and the second feedback information corresponds to a PDSCH reception occasion occasion-a1, a PDSCH reception occasion occasion-a2 and a PDSCH reception occasion occasion-a3. In the sorting sequence of the first feedback information and the second feedback information, because a number of a time domain unit of the PDSCH reception occasion occasion-a0 is less than a number of a time domain unit of the PDSCH reception occasion occasion-a1, the PDSCH reception occasion occasion-a2, and the PDSCH reception occasion occasion-a3, during HARQ codebook sorting, the first feedback information is ranked before the second feedback information. For another example, if the feedback information further includes third feedback information and fourth feedback information, the second feedback information may correspond to the PDSCH reception occasion occasion-a1, the third feedback information may correspond to the PDSCH reception occasion occasion-a2, and the fourth feedback information may correspond to the PDSCH reception occasion occasion-a3. In this case, during the HARQ codebook sorting, a ranking sequence is as follows: the first feedback information, the second feedback information, the third feedback information, and the fourth feedback information.

The terminal device feeds back, on uplink control information corresponding to the configuration group identifier, the feedback information that is on the PDSCH reception occasion associated with each configuration group identifier.

Similarly, feedback information of a PDSCH reception occasion corresponding to the identifier B may also be sorted according to the same rule. As shown in FIG. 3, finally determined HARQ-ACK information corresponding to the PDSCH reception occasion is sorted in a feedback sequence as follows: an occasion-b0, an occasion-b1, and an occasion-b2. It should be noted that the foregoing sorting rule is merely an example, and this disclosure is not limited thereto. When the network device configures a plurality of cells for the terminal device, the terminal device may sort feedback information in ascending order of cell identifier values. To be specific, feedback information on a PDSCH reception occasion with a smaller cell identifier value is preferentially ranked before feedback information on a PDSCH reception occasion with a larger cell identifier value. Sorting of feedback information on a PDSCH reception occasion in a cell is described in the foregoing embodiment, and details are not described herein again.

For example, when the network device configures a plurality of cells for the terminal device, two cells (a CC 1 and a CC 2) are used as an example. Assuming that an identifier value of the CC 1 is "1", and an identifier value of the CC 2 is "2", the identifier value of the CC 2 is greater than the identifier value of the CC 1. For any configuration group identifier, a PDSCH reception occasion corresponding to the configuration group identifier is first calculated based on a higher layer configuration (for example, a PDSCH time domain allocation list and a K1 set that are configured in the CC 1) of the CC 1, and then feedback information on the PDSCH reception occasion is sorted in a manner of sorting the feedback information on the PDSCH reception occasion in the cell. Next, a PDSCH reception occasion corresponding to the configuration group identifier is calculated based on a higher layer configuration (for example, a PDSCH time domain allocation list and a K1 set that are configured in the CC 2) of the CC 2, and then feedback information on the PDSCH reception occasion is sorted in the manner of sorting the feedback information on the PDSCH reception occasion in the cell. Finally, the sorted feedback information is sent on an uplink resource corresponding to the configuration group identifier.

A joint feedback manner:

Optionally, the terminal device determines an uplink resource based on a configuration group identifier, and sends, on the determined uplink resource, feedback information of PDSCH reception occasions corresponding to all configuration group identifiers. That the terminal device determines an uplink resource based on a configuration group identifier includes: The terminal device determines, based on DCI transmitted on a PDCCH associated with one of a plurality of configuration group identifiers, that an uplink resource indicated by the DCI is the determined uplink resource. For example, it is assumed that there are configuration group identifiers A and B. Feedback information of a PDSCH reception occasion corresponding to A is feedback information A, feedback information of a PDSCH reception occasion corresponding to B is feedback information B, an uplink resource corresponding to A is an uplink resource A, and an uplink resource corresponding to B is an uplink resource B. In this case, the terminal device determines, based on the uplink resource A and the uplink resource B, to send, on the uplink resource A, feedback information to be jointly fed back. That is, the terminal device sends the feedback information A and the feedback information B on the uplink resource A. The terminal device determines, based on an indication of the downlink control information DCI, the uplink resource used for uplink transmission. The downlink control information DCI is the last piece of DCI. Optionally, the terminal device determines a selected PUCCH resource set based on a size of uplink control information UCI bit information, and then selects, based on a PUCCH resource indicator field in the last piece of DCI, a PUCCH resource in the determined PUCCH resource set as the uplink resource for the uplink transmission. The last piece of DCI is determined based on at least one of cell identifiers, PDCCH monitoring occasions, or configuration group identifiers.

In the joint feedback manner, a rule for determining the last piece of DCI may be:

1. When the network device configures one cell for the terminal device, preferably, there are two different solutions: a solution 1 and a solution 2.

Solution 1: A method for determining the last piece of DCI is as follows: The terminal device first sorts configuration group identifier values in ascending order, and determines a configuration group identifier corresponding to the largest configuration group identifier value. The terminal device determines the latest PDCCH monitoring occasion in PDCCH monitoring occasions corresponding to the configuration group identifier, and determines the last piece of DCI in DCI detected on the latest PDCCH monitoring occasion. The terminal device sorts the PDCCH monitoring occasions in a sequence of start symbol positions of the PDCCH monitoring occasions, and a PDCCH monitoring occasion with the latest start symbol position is the latest PDCCH monitoring occasion.

For example, the terminal device sorts the configuration group identifier values in ascending order, and determines the configuration group identifier corresponding to the largest configuration group identifier value. Specifically, in different configuration group identifiers, two configuration group identifiers (A0 and A1) are used as an example. A value of the configuration group identifier A1 is greater than a value of the configuration group identifier A0. Therefore, it is determined that the configuration group identifier corresponding to the largest configuration group identifier value is A1.

A process of determining the latest PDCCH monitoring occasion in PDCCH monitoring occasions corresponding to a determined configuration group identifier has been described in detail in the foregoing embodiment, and details are not described herein again. For example, A1 corresponds to a PDCCH monitoring occasion 1 and a PDCCH monitoring occasion 3, and the PDCCH monitoring occasion 3 is the latest PDCCH monitoring occasion.

Optionally, in PDCCH monitoring occasions corresponding to a configuration group identifier with a larger configuration group identifier value, if only one piece of DCI can be sent to one user on one PDCCH monitoring occasion, the DCI detected on the latest PDCCH monitoring occasion is the last piece of DCI. For example, it is assumed that A1 is the largest value in the determined configuration group identifiers, and the PDCCH monitoring occasion 3 corresponding to A1 is the determined latest PDCCH monitoring occasion. If DCI detected on the PDCCH monitoring occasion 3 is DCI 0, the DCI 0 is determined as the last piece of DCI.

Optionally, in the PDCCH monitoring occasions corresponding to the configuration group identifier with the larger configuration group identifier value, if more than one piece of DCI can be sent to one user on one PDCCH monitoring occasion, DCI that has the latest start symbol position and that is in DCI detected on the latest PDCCH monitoring occasion is determined as the last piece of DCI. For example, it is assumed that A1 is the largest value in the determined configuration group identifiers, and the PDCCH monitoring occasion 3 corresponding to A1 is the determined latest PDCCH monitoring occasion. If DCI detected on the PDCCH monitoring occasion 3 is DCI 0 and DCI 1, and a start symbol position of the DCI 1 is the latest, the DCI 1 is determined as the last piece of DCI.

Solution 2: A method for determining the last piece of DCI is as follows: The terminal device first sorts PDCCH monitoring occasions in ascending order, determines the latest PDCCH monitoring occasion, and determines the last piece of DCI based on configuration group identifier values that correspond to DCI detected on the latest PDCCH monitoring occasion and that are sorted in ascending order.

For example, the terminal device sorts the PDCCH monitoring occasions in a sequence of start symbol positions of the PDCCH monitoring occasions, and a PDCCH monitoring occasion with the latest start symbol position is the latest PDCCH monitoring occasion. In the process, information about a configuration group identifier is not considered. This is consistent with the conventional technology. For example, all PDCCH monitoring occasions may be calculated based on a configuration of a CORESET and a configuration of a search space. The PDCCH monitoring occasion with the latest start symbol position is the latest PDCCH monitoring occasion.

Optionally, if only one piece of DCI corresponding to one configuration group identifier can be sent to one user on one PDCCH monitoring occasion, in DCI detected on the latest PDCCH monitoring occasion, corresponding DCI with the largest configuration group identifier value is the last piece of DCI. For example, a PDCCH monitoring occasion 1 is the determined latest PDCCH monitoring occasion. DCI detected on the PDCCH monitoring occasion 1 is DCI 1 and DCI 3. The DCI 1 corresponds to a configuration group identifier value A0. The DCI 3 corresponds to a configuration group identifier value A1. In addition, a value of the configuration group identifier A1 is greater than a value of the configuration group identifier A0. In this case, the DCI 3 corresponding to A1 is determined as the last piece of DCI.

Optionally, if more than one piece of DCI corresponding to one configuration group identifier can be sent to one user on one PDCCH monitoring occasion, in DCI corresponding to the largest configuration group identifier value in DCI detected on the latest PDCCH monitoring occasion, DCI with the latest start symbol position is the last piece of DCI.

For example, a PDCCH monitoring occasion 1 is the determined latest PDCCH monitoring occasion. DCI detected on the PDCCH monitoring occasion 1 is DCI 1, DCI 2, and DCI 3. The DCI 1 corresponds to a configuration group identifier value A0. The DCI 2 and the DCI 3 correspond to a configuration group identifier value A1. In addition, a value of the configuration group identifier A1 is greater than a value of the configuration group identifier A0, and in the DCI corresponding to A1, a start symbol position of the DCI 3 is the latest. In this case, the DCI 3 is determined as the last piece of DCI.

2. When the network device configures a plurality of cells for the terminal device and the plurality of cells can simultaneously serve the terminal device, different DCI may be sent to the terminal device in different cells. The last piece of DCI is determined based on different sorting combinations of the PDCCH monitoring occasion, the cell identifier, and the configuration group identifier. Preferably, there are six different solutions: a solution 1, a solution 2, a solution 3, a solution 4, a solution 5, and a solution 6.

Solution 1: The last piece of DCI is determined as follows: The terminal device first sorts configuration group identifier values in ascending order, and determines a configuration group identifier corresponding to the largest configuration group identifier value. The terminal device determines the latest PDCCH monitoring occasion in PDCCH monitoring occasions corresponding to the configuration group identifier. In DCI detected on the latest PDCCH monitoring occasion, the terminal device then sorts the DCI based on corresponding cell identifier values, and determines DCI corresponding to the largest cell identifier value as the last piece of DCI.

A process in which the terminal device determines the configuration group identifier corresponding to the largest configuration group identifier value and determines the latest PDCCH monitoring occasion corresponding to the configuration group identifier has been described in detail in the foregoing embodiment, and details are not described herein again.

Optionally, in PDCCH monitoring occasions corresponding to a configuration group identifier with a larger configuration group identifier value, if only one piece of DCI can be sent to one user in each cell on one PDCCH monitoring occasion, DCI that is sent in a cell with the largest cell identifier value and that is detected on the latest PDCCH monitoring occasion is the last piece of DCI. For example, it is assumed that A1 is the determined largest configuration group identifier value. A PDCCH monitoring occasion 3 corresponding to A1 is the determined latest PDCCH monitoring occasion. The PDCCH monitoring occasion 3 corresponds to a plurality of cells (for example, two cells: a CC 0 and a CC 1). Assuming that an identifier value of the CC 0 is "0", and an identifier value of the CC 1 is "1", the identifier value of the CC 1 is greater than the identifier value of the CC 0. The DCI 0 is sent in the CC 0, and the DCI 1 is sent in the CC 1. In this case, the DCI 1 sent in the CC 1 on the PDCCH monitoring occasion 3 is determined as the last piece of DCI.

Optionally, in the PDCCH monitoring occasion corresponding to the configuration group identifier with the larger configuration group identifier value, if more than one piece of DCI can be sent to one user in each cell on one PDCCH monitoring occasion, in DCI that is detected on the latest PDCCH monitoring occasion and that is sent in a cell corresponding to the largest cell identifier value, DCI with the latest start symbol is determined as the last piece of DCI. For example, it is assumed that A1 is the determined largest configuration group identifier value. A PDCCH monitoring occasion 3 corresponding to A1 is the determined latest PDCCH monitoring occasion. The PDCCH monitoring occasion 3 corresponds to a plurality of cells (for example, two cells: a CC 0 and a CC 1). An identifier value of the CC 0 is "0", and an identifier value of the CC 1 is "1". In this case, the identifier value of the CC 1 is greater than the identifier value of the CC 0. DCI 0 and DCI 2 are sent in the CC 0. DCI 1 and DCI 3 are sent in the CC 1. In the DCI sent in the CC 1 on the PDCCH monitoring occasion 3, the DCI 3 has the latest start symbol position. Therefore, the DCI 3 is determined as the last piece of DCI.

Solution 2: The last piece of DCI is determined as follows: The terminal device first sorts configuration group identifier values in ascending order, and determines a configuration group identifier corresponding to the largest configuration group identifier value. The terminal device first sorts, based on cell identifier values, DCI corresponding to the configuration group identifier, and determines DCI corresponding to the largest cell identifier value. The terminal device then sorts PDCCH monitoring occasions on which the determined DCI is located, and determines DCI detected on the latest PDCCH monitoring occasion as the last piece of DCI corresponding to the configuration group identifier.

For example, a process in which the terminal device determines the configuration group identifier corresponding to the largest configuration group identifier value and determines the latest PDCCH monitoring occasion corresponding to the configuration group identifier has been described in detail in the foregoing embodiment, and details are not described herein again.

Optionally, in a cell associated with a configuration group identifier with a larger configuration group identifier value, if only one piece of DCI can be sent to one user in one cell on one PDCCH monitoring occasion, the DCI detected on the latest PDCCH monitoring occasion corresponding to the largest cell identifier value is determined as the last piece of DCI. For example, it is assumed that A1 is the determined largest configuration group identifier value. CC 1 is the determined largest cell identifier value. CC 1 corresponds to a plurality of PDCCH monitoring occasions (for example, two PDCCH monitoring occasions: a PDCCH monitoring occasion 1 and a PDCCH monitoring occasion 3). The PDCCH monitoring occasion 3 is the determined latest PDCCH monitoring occasion. In this case, DCI 3 detected on the PDCCH monitoring occasion 3 corresponding to CC 1 is determined as the last piece of DCI.

Optionally, in the cell associated with the configuration group identifier with the larger configuration group identifier value, if more than one piece of DCI can be sent to one user in one cell on one PDCCH monitoring occasion, in the DCI detected on the latest PDCCH monitoring occasion corresponding to the largest cell identifier value, DCI with the latest start symbol position is determined as the last piece of DCI. For example, it is assumed that A1 is the determined largest configuration group identifier value. CC 1 is the determined largest cell identifier value. CC 1 corresponds to a plurality of PDCCH monitoring occasions (for example, two PDCCH monitoring occasions: a PDCCH monitoring occasion 1 and a PDCCH monitoring occasion 3). DCI detected on the PDCCH monitoring occasion 1 is DCI 0 and DCI 2. DCI detected on the PDCCH monitoring occasion 3 is DCI 1 and DCI 3. The PDCCH monitoring occasion 3 corresponding to CC 1 is the determined latest PDCCH monitoring occasion. A start symbol position of the DCI 3 detected on the PDCCH monitoring occasion 3 is the latest.

In this case, the DCI 3 detected on the PDCCH monitoring occasion 3 corresponding to CC 1 is determined as the last piece of DCI.

Solution 3: The last piece of DCI is determined as follows: The terminal device first sorts PDCCH monitoring occasions in ascending order, and determines the latest PDCCH monitoring occasion. The terminal device then detects DCI on the latest PDCCH monitoring occasion, and determines, in ascending order of cell identifier values, DCI corresponding to the largest cell identifier value. The terminal device finally determines, based on configuration group identifier values that correspond to the DCI and that are sorted in ascending order, DCI corresponding to the largest configuration group identifier value as the last piece of DCI.

For example, the terminal device sorts the PDCCH monitoring occasions in a sequence of start symbol positions of the PDCCH monitoring occasions, and a PDCCH monitoring occasion with the latest start symbol position is the latest PDCCH monitoring occasion. In the process, information about a configuration group identifier is not considered. This is consistent with the conventional technology. For example, all PDCCH monitoring occasions may be calculated based on a configuration of a CORESET and a configuration of a search space. The PDCCH monitoring occasion with the latest start symbol position is the latest PDCCH monitoring occasion.

Optionally, if only one piece of DCI can be sent to one user in each cell on one PDCCH monitoring occasion, DCI that is sent in a cell with the largest cell identifier value and that is detected on the latest PDCCH monitoring occasion is determined as the last piece of DCI. For example, it is assumed that a PDCCH monitoring occasion 1 is determined as the latest PDCCH monitoring occasion. If DCI detected on the PDCCH monitoring occasion 1 is DCI 0 and DCI 1 and the PDCCH monitoring occasion 1 corresponds to a plurality of cells (for example, two cells: a CC 0 and a CC 1), assuming that an identifier value of the CC 0 is "0", and an identifier value of the CC 1 is "1", the identifier value of the CC 1 is greater than the identifier value of the CC 0. The DCI 0 is sent in the CC 0, and the DCI 1 is sent in the CC 1. In this case, the DCI 1 sent in the CC 1 is determined as the last piece of DCI.

Optionally, if only one piece of DCI can be sent to one user on one PDCCH monitoring occasion on each network device, and a plurality of network devices are located in one cell, in DCI that is in the DCI detected on the latest PDCCH monitoring occasion and that is sent in a cell corresponding to the largest cell identifier value, the DCI corresponding to the largest configuration group identifier value is determined as the last piece of DCI. For example, it is assumed that a PDCCH monitoring occasion 1 is determined as the latest PDCCH monitoring occasion. If DCI detected on the PDCCH monitoring occasion 1 is DCI 0 and DCI 1 and the PDCCH monitoring occasion 1 corresponds to a plurality of cells (for example, two cells: a CC 0 and a CC 1), assuming that an identifier value of the CC 0 is "0", and an identifier value of the CC 1 is "1", the identifier value of the CC 1 is greater than the identifier value of the CC 0. The DCI 0 and the DCI 1 are sent in the CC 1. The DCI 0 corresponds to a configuration group identifier A0, the DCI 1 corresponds to a configuration group identifier A1, and a value of the configuration group identifier A1 is greater than a value of the configuration group identifier A0. In this case, the DCI 1 sent in the CC 1 is determined as the last piece of DCI.

Optionally, if more than one piece of DCI can be sent to one user in each cell on one PDCCH monitoring occasion, in DCI that is detected on the latest PDCCH monitoring occasion and that is sent in a cell corresponding to the largest cell identifier value, DCI that corresponds to the latest start symbol position and that is in the DCI corresponding to the largest configuration group identifier value is determined as the last piece of DCI. For example, it is assumed that a PDCCH monitoring occasion 1 is determined as the latest PDCCH monitoring occasion. If DCI detected on the PDCCH monitoring occasion 1 is DCI 0, DCI 1, and DCI 2 and the PDCCH monitoring occasion 1 corresponds to a plurality of cells (for example, two cells: a CC 0 and a CC 1), assuming that an identifier value of the CC 0 is "0", and an identifier value of the CC 1 is "1", the identifier value of the CC 1 is greater than the identifier value of the CC 0. The DCI 0 sent in the CC 1 corresponds to a configuration group identifier A0. The DCI 1 and the DCI 2 sent in the CC 1 correspond to a configuration group identifier A1. A value of the configuration group identifier A1 is greater than a value of the configuration group identifier A0, and a start symbol position of the DCI 2 is the latest. In this case, the DCI 2 sent in the CC 1 is determined as the last piece of DCI.

Solution 4: The last piece of DCI is determined as follows: The terminal device first sorts PDCCH monitoring occasions in ascending order, and determines the latest PDCCH monitoring occasion. The terminal device then sorts, in ascending order of configuration group identifier values corresponding to DCI, the DCI detected on the latest PDCCH monitoring occasion, and determines DCI corresponding to the largest configuration group identifier value. The terminal device finally sorts the DCI in ascending order of cell identifier values, and determines DCI corresponding to the largest cell identifier value as the last piece of DCI.

For example, it is assumed that a PDCCH monitoring occasion 1 is determined as the latest PDCCH monitoring occasion. The PDCCH monitoring occasion 1 corresponds to a plurality of configuration group identifiers (for example, two configuration group identifiers: A0 and A1). A value of the configuration group identifier A1 is greater than a value of the configuration group identifier A0. In this case, it is determined that DCI corresponding to the configuration group identifier A1 is selected. A plurality of cells, for example, a CC 0 and a CC 1, are associated with the configuration group identifier A1. Assuming that an identifier value of the CC 0 is "0", and an identifier value of the CC 1 is "1", the identifier value of the CC 1 is greater than the identifier value of the CC 0. If DCI 0 and DCI 2 are sent in the CC 0, DCI 1 and DCI 3 are sent in the CC 1, and a start symbol position of the DCI 3 is later than a start symbol position of the DCI 1, it is determined that the DCI 3 sent in the CC 1 is the last piece of DCI.

Solution 5: The last piece of DCI is determined as follows: The terminal device first sorts DCI in ascending order of cell identifier values, and determines DCI corresponding to the largest cell identifier value. The terminal device then sorts PDCCH monitoring occasions corresponding to the cell in ascending order, and determines the latest PDCCH monitoring occasion. The terminal device finally sorts, in ascending order of configuration group identifier values corresponding to DCI, the DCI detected on the latest PDCCH monitoring occasion, and determines DCI corresponding to the largest configuration group identifier value as the last piece of DCI.

For example, the terminal device sorts, in a sequence of start symbol positions of the PDCCH monitoring occasions, the PDCCH monitoring occasions corresponding to the cell, and a PDCCH monitoring occasion with the latest start symbol position is the latest PDCCH monitoring occasion. In the process, information about a configuration group identifier is not considered. This is consistent with the conventional technology. For example, all PDCCH monitoring occasions may be calculated based on a configuration of a CORESET and a configuration of a search space. The PDCCH monitoring occasion with the latest start symbol position is the latest PDCCH monitoring occasion.

Optionally, to determine DCI sent in the cell with the largest cell identifier value, an example is used. For example, there are two cells: a CC 0 and a CC 1. Assuming that an identifier value of the CC 0 is "0", and an identifier value of the CC 1 is "1", the identifier value of the CC 1 is greater than the identifier value of the CC 0. In different PDCCH monitoring occasions (denoted as a PDCCH monitoring occasion 0 and a PDCCH monitoring occasion 1) corresponding to the CC 1, if only one piece of DCI can be sent to one user on one PDCCH monitoring occasion, the DCI detected on the latest PDCCH monitoring occasion is determined as the last piece of DCI. For example, it is assumed that DCI detected on the PDCCH monitoring occasion 0 is DCI 0, DCI detected on the PDCCH monitoring occasion 1 is DCI 1, and the PDCCH monitoring occasion 1 is determined as the latest PDCCH monitoring occasion. In this case, the DCI 1 detected on the PDCCH monitoring occasion 1 is determined as the last piece of DCI.

Optionally, to determine DCI sent in the cell with the largest cell identifier value, an example is used. For example, there are two cells: a CC 0 and a CC 1. Assuming that an identifier value of the CC 0 is "0", and an identifier value of the CC 1 is "1", the identifier value of the CC 1 is greater than the identifier value of the CC 0. In different PDCCH monitoring occasions (denoted as a PDCCH monitoring occasion 0 and a PDCCH monitoring occasion 1) corresponding to the CC 1, if only one piece of DCI can be sent to one user on each TRP on each of the different PDCCH monitoring occasions, the DCI with the largest configuration group identifier value in the DCI detected on the latest PDCCH monitoring occasion is determined as the last piece of DCI. For example, it is assumed that the PDCCH monitoring occasion 1 is determined as the latest PDCCH monitoring occasion. DCI detected on the PDCCH monitoring occasion 1 is DCI 0 and DCI 1. The DCI 0 corresponds to a configuration group identifier A0. The DCI 1 corresponds to a configuration group identifier A1. In addition, an identifier value of the configuration group identifier A1 is greater than an identifier value of the configuration group identifier A0. In this case, the DCI 1 corresponding to the configuration group identifier A1 is determined as the last piece of DCI.

Optionally, to determine DCI sent in the cell with the largest cell identifier value, an example is used. For example, there are two cells: a CC 0 and a CC 1. Assuming that an identifier value of the CC 0 is "0", and an identifier value of the CC 1 is "1", the identifier value of the CC 1 is greater than the identifier value of the CC 0. In different PDCCH monitoring occasions (denoted as a PDCCH monitoring occasion 0 and a PDCCH monitoring occasion 1) corresponding to the CC 1, if more than one piece of DCI can be sent to one user on one PDCCH monitoring occasion, the DCI corresponding to the largest configuration group identifier value in the DCI detected on the latest PDCCH monitoring occasion is determined as the last piece of DCI. For example, it is assumed that the PDCCH monitoring occasion 1 is determined as the latest PDCCH monitoring occasion. DCI detected on the PDCCH monitoring occasion 1 is DCI 0, DCI 1, and DCI 2. The DCI 0 corresponds to a configuration group identifier A0. The DCI 1 corresponds to a configuration group identifier A1. The DCI 2 corresponds to a configuration group identifier A2. A value of the configuration group identifier A2 is greater than an identifier value of the configuration group identifier A1, and the identifier value of the configuration group identifier A1 is greater than an identifier value of the configuration group identifier A0. In this case, in the DCI detected on the PDCCH monitoring occasion 1, the identifier value of the configuration group identifier value A2 corresponding to the DCI 2 is the largest, so that the DCI 2 is determined as the last piece of DCI.

Solution 6: The last piece of DCI is determined as follows: The terminal device first sorts DCI in ascending order of cell identifier values, and determines DCI corresponding to the largest cell identifier value. The terminal device then sorts the DCI in ascending order of configuration group identifier values, and determines DCI corresponding to the largest configuration group identifier value. The terminal device finally sorts, in ascending order, PDCCH monitoring occasions corresponding to the cell, determines the latest PDCCH monitoring occasion, and determines DCI detected on the latest PDCCH monitoring occasion as the last piece of DCI.

For example, there are two cells: a CC 0 and a CC 1. Assuming that an identifier value of the CC 0 is "0", and an identifier value of the CC 1 is "1", the identifier value of the CC 1 is greater than the identifier value of the CC 0. It is determined, based on the value of the cell identifiers, that the cell with the largest cell identifier is the CC 1. It is assumed that in different configuration group identifiers (denoted as A0 and A1, where an identifier value of the configuration group identifier A1 is greater than an identifier value of the configuration group identifier A0) corresponding to the CC 1, the DCI corresponding to the largest configuration group identifier value is found from DCI sent in the CC 1, and is DCI corresponding to the configuration group identifier A1. The latest PDCCH monitoring occasion corresponding to the cell identifier A1 is determined. DCI that is found from the DCI corresponding to the determined configuration group identifier A1 and that is detected on the PDCCH monitoring occasion is determined as the last piece of DCI. For example, it is assumed that A1 is determined as the largest configuration group identifier. A1 corresponds to different PDCCH monitoring occasions (for example, two PDCCH monitoring occasions: a PDCCH monitoring occasion 0 and a PDCCH monitoring occasion 1). The PDCCH monitoring occasion 1 is determined as the latest PDCCH monitoring occasion, and DCI detected on the PDCCH monitoring occasion 1 is DCI 1. In this case, the DCI 1 detected on the PDCCH monitoring occasion 1 is determined as the last piece of DCI. Still further, if more than one piece of DCI detected on the PDCCH monitoring occasion is found from the DCI corresponding to the determined configuration group identifier A1, DCI with the latest start symbol position is selected as the last piece of DCI. For example, it is assumed that A1 is determined as the largest configuration group identifier. A1 corresponds to different PDCCH monitoring occasions (for example, two PDCCH monitoring occasions: a PDCCH monitoring occasion 0 and a PDCCH monitoring occasion 1). The PDCCH monitoring occasion 1 is determined as the latest PDCCH monitoring occasion, DCI detected on the PDCCH monitoring occasion 1 is DCI 1 and DCI 3, and a start symbol position of the DCI 3 is the latest. In this case, the DCI 3 detected on the PDCCH monitoring occasion 1 is determined as the last piece of DCI.

It should be noted that the foregoing sorting rule of determining the last piece of DCI is merely an example, and the latest PDCCH monitoring occasion, the largest configuration group identifier, and the cell identifier are not limited. Different conditions may be added or different forms may be used. For example, different from the foregoing example, when the last piece of DCI is determined, the smallest cell identifier value, or the smallest configuration group identifier value may be considered. This is not limited in the present disclosure.

In the joint feedback manner, the rule of the feedback sorting may be:

1. Preferably sort by time:

When the network device configures one cell for the terminal device, the terminal device first calculates PDSCH reception occasions based on configuration group identifiers (for example, two configuration group identifiers: an identifier A and an identifier B, and a value of the identifier A is less than a value of the identifier B). On an uplink resource determined based on one configuration group identifier, the terminal device maps, to a HARQ codebook in a sequence obtained according to a method for calculating the PDSCH reception occasions, feedback information of the PDSCH reception occasions associated with the configuration group identifiers, and feeds back the feedback information to the network device.

For example, the terminal device calculates the PDSCH reception occasions corresponding to the configuration group identifiers. Details have been described in the foregoing embodiment, and details are not described herein again.

The feedback information of the PDSCH reception occasion associated with each configuration group identifier includes at least first feedback information and second feedback information, and a sequence of the first feedback information and the second feedback information corresponds to the feedback sorting. The feedback information is sorted as follows: The first feedback information is ranked before the second feedback information, where a number of a time domain unit (for example, a slot) in which a PDSCH reception occasion corresponding to the first feedback information is located is less than a number of a time domain unit in which a PDSCH reception occasion corresponding to the second feedback information is located. Further optionally, in a same time domain unit, a start position of a downlink OFDM symbol occupied by the PDSCH reception occasion corresponding to the first feedback information is earlier than a start position of a downlink OFDM symbol occupied by the PDSCH reception occasion corresponding to the second feedback information. Further optionally, in a same time domain unit, if occupied downlink OFDM symbols are the same, a group identifier value associated with the PDSCH reception occasion corresponding to the first feedback information is less than a group identifier value associated with the PDSCH reception occasion corresponding to the second feedback information.

For example, as shown in FIG. 3, an example in which a PDSCH reception occasion occasion-a0 is associated with a configuration group identifier A, and a PDSCH reception occasion occasion-b0 is associated with a configuration group identifier B is used. It is assumed that the first feedback information corresponds to the PDSCH reception occasion occasion-a0, and that the second feedback information corresponds to the PDSCH reception occasion occasion-b0. In the sorting sequence of the first feedback information and the second feedback information, because a start position of a downlink OFDM symbol occupied by the PDSCH reception occasion occasion-a0 is earlier than a start position of a downlink OFDM symbol occupied by the occasion-b0, during HARQ codebook sorting, the first feedback information is ranked before the second feedback information. For another example, it is assumed that the first feedback information corresponds to a PDSCH reception occasion occasion-a1, and that the second feedback information corresponds to a PDSCH reception occasion occasion-b1. In the sorting sequence of the first feedback information and the second feedback information, because a group identifier value associated with the PDSCH reception occasion occasion-a1 is less than a group identifier value associated with the occasion-b1, during HARQ codebook sorting, the first feedback information ranked before the second feedback information. For another example, if the feedback information further includes third feedback information, fourth feedback information, fifth feedback information, sixth feedback information, and seventh feedback information, correspondences may be as follows: The first feedback information may correspond to a PDSCH reception occasion occasion-a0. The second feedback information may correspond to a PDSCH reception occasion occasion-b0. The third feedback information may correspond to a PDSCH reception occasion occasion-a1. The fourth feedback information may correspond to a PDSCH reception occasion occasion-b1. The fifth feedback information may correspond to a PDSCH reception occasion occasion-b2. The sixth feedback information may correspond to a PDSCH reception occasion occasion-a2. The seventh feedback information may correspond to a PDSCH reception occasion occasion-a3. In this case, during HARQ codebook sorting, a ranking sequence is as follows: the first feedback information, the second feedback information, the third feedback information, the fourth feedback information, the fifth feedback information, the sixth feedback information, and the seventh feedback information.

It should be noted that the foregoing sorting rule is merely an example, and this disclosure is not limited thereto.

When the network device configures a plurality of cells for the terminal device, the terminal device may sort feedback information in ascending order of cell identifier values. To be specific, feedback information on a PDSCH reception occasion with a smaller cell identifier is preferentially ranked before feedback information on a PDSCH reception occasion with a larger cell identifier value. Sorting of feedback information on a PDSCH reception occasion in a cell is described in the foregoing embodiment, and details are not described herein again.

For example, when the network device configures a plurality of cells for the terminal device, two cells (a CC 1 and a CC 2) are used as an example. Assuming that an identifier value of the CC 1 is "1", and an identifier value of the CC 2 is "2", the identifier value of the CC 2 is greater than the identifier value of the CC 1. The PDSCH reception occasions are calculated based on configuration group identifiers. For any configuration group identifier, a PDSCH reception occasion corresponding to the configuration group identifier is first calculated based on a higher layer configuration of the CC 1, and then feedback information on the PDSCH reception occasion is sorted in a manner of sorting the feedback information on the PDSCH reception occasion in the cell. Next, a PDSCH reception occasion corresponding to the configuration group identifier is calculated based on a higher layer configuration of the CC 2, and then feedback information on the PDSCH reception occasion is sorted in the manner of sorting the feedback information on the PDSCH reception occasion in the cell. Finally, the sorted feedback information is sent on an uplink resource corresponding to the configuration group identifier.

2. Preferably sort based on a TRP:

When the network device configures one cell for the terminal device, the terminal device first calculates PDSCH reception occasions based on configuration group identifiers (for example, two configuration group identifiers: an identifier A and an identifier B, and a value of the identifier A is less than a value of the identifier B), and sorts feedback information of a PDSCH reception occasion associated with A and feedback information of a PDSCH reception occasion associated with B. Because feedback information with a smaller configuration group identifier value is preferentially sorted, and the value of the identifier A is less than the value of the identifier B, the feedback information of the PDSCH reception occasion associated with A is preferentially sorted. In the feedback information of the PDSCH reception occasion associated with A, for PDSCH reception occasions in different slots, feedback information of a PDSCH reception occasion located in a slot with a smaller slot number is ranked in the front. Further optionally, for PDSCH reception occasions in a same slot, feedback information may be sorted in a sequence of start positions of downlink OFDM symbols occupied by the PDSCH reception occasions. For example, feedback information of a PDSCH reception occasion whose corresponding start position of a downlink OFDM symbol occupied by the PDSCH reception occasion is in the front is ranked in the front. A rule for sorting the feedback information of the PDSCH reception occasion corresponding to the identifier B is similar, and details are not described herein again.

As shown in FIG. 3, a finally determined sorting sequence of HARQ-ACK information corresponding to PDSCH reception occasions is sorted in a feedback sequence as follows: an occasion-a0, an occasion-a1, an occasion-a2, an occasion-a3, an occasion-b0, an occasion-b1, and an occasion-b2.

When the network device configures a plurality of cells (for example, two cells: a CC 1 and a CC 2) for the terminal device, the terminal device may preferentially sort feedback information based on a cell identifier value corresponding to a reception occasion. For example, feedback information corresponding to a PDSCH reception occasion with a smaller cell identifier value is ranked in the front. Feedback information of PDSCH reception occasions corresponding to the CC 1 and the CC 2 is sorted according to a sorting rule of one cell.

For example, when the network device configures a plurality of cells for the terminal device, the terminal device first calculates PDSCH reception occasions based on configuration group identifiers (for example, two configuration group identifiers: an identifier A and an identifier B, and a value of the identifier A is less than a value of the identifier B), and sorts feedback information of a PDSCH reception occasion associated with A and feedback information of a PDSCH reception occasion associated with B. For example, the feedback information of the PDSCH reception occasion associated with A is preferentially sorted. Further optionally, PDSCH reception occasions that are associated with a same configuration group identifier and that are in different cells may be sorted in ascending order of cell identifier values corresponding to the PDSCH reception occasions. Corresponding feedback information is mapped to a HARQ feedback codebook, and fed back to a corresponding network device. Further optionally, for PDSCH reception occasions that are in a same cell and that are in different slots, feedback information of a PDSCH reception occasion located in a slot with a smaller slot number is ranked in the front. Further optionally, for PDSCH reception occasions in a same slot, feedback information may be sorted in a sequence of start positions of downlink OFDM symbols occupied by the PDSCH reception occasions. For example, feedback information of a PDSCH reception occasion whose corresponding start position of a downlink OFDM symbol occupied by the PDSCH reception occasion is in the front is ranked in the front.

It should be noted that the foregoing sorting rule of the joint feedback is only an example, and different conditions may be added or different forms may be used. For example, different from the foregoing example, feedback information of a PDSCH reception occasion with a larger group identifier may be preferentially sorted, or feedback information corresponding to a larger cell identifier value may be preferentially sorted.

In this embodiment of this disclosure, the configuration group identifier is associated with the PDSCH reception occasion. Therefore, feedback information of PDSCH reception occasions in a multi-station scenario can be sorted based on the group identifier and according to the predetermined sorting rule. Even if scheduling of PDSCHs by a plurality of stations overlaps in time domain resources, PDSCH reception occasions corresponding to different network devices can also be distinguished based on configuration group identifiers, to implement HARQ feedback for downlink data transmission in the multi-station scenario.

Figure 4:
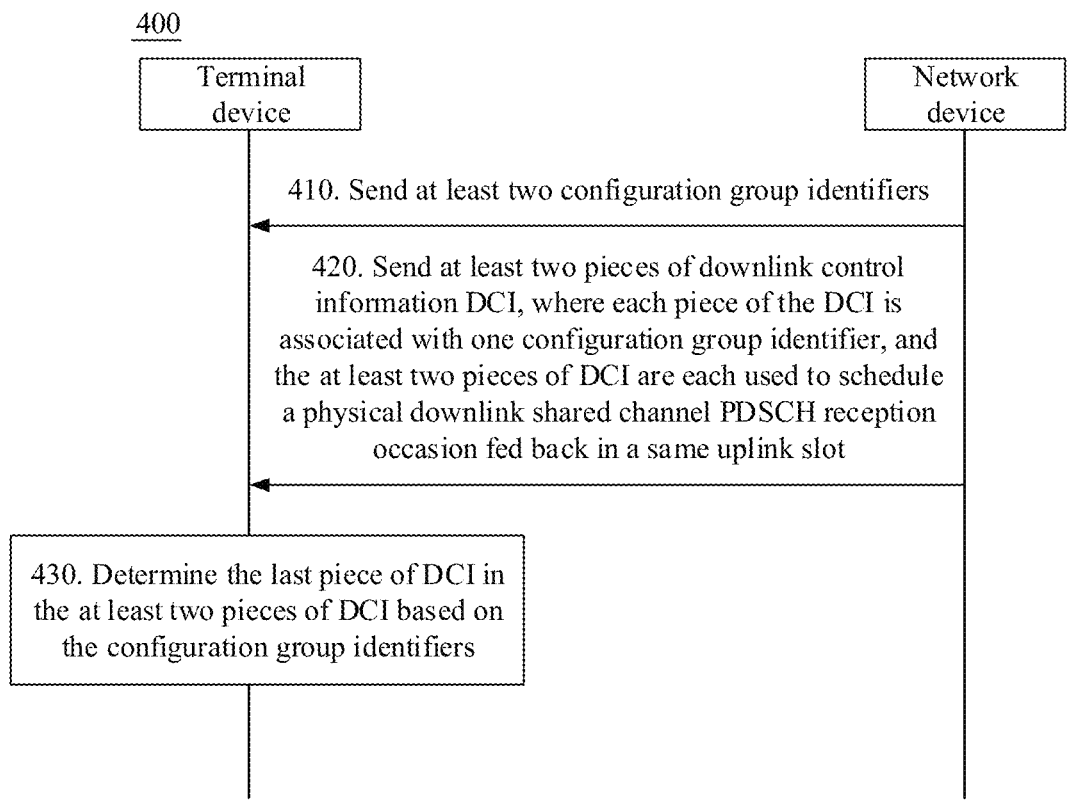
FIG. 4 is a schematic flowchart of a communication method 400 from a perspective of device interaction according to another embodiment of this disclosure.

FIG. 4 is a schematic flowchart of a communication method 400 from a perspective of device interaction according to another embodiment of this disclosure. As shown in the figure, the method 400 may include operation 410 to operation 430. The following describes the operations in the method 400 in detail. In a same uplink slot, DCI is associated with a configuration group identifier, and feedback information is sorted based on an uplink resource indicated by the last piece of DCI. The operations are as follows:

S410. Send at least two configuration group identifiers.

S420. Send at least two pieces of downlink control information DCI, where each piece of the DCI is associated with one configuration group identifier, and the at least two pieces of DCI are each used to schedule a physical downlink shared channel PDSCH reception occasion fed back in the same uplink slot.

S430. Determine the last piece of DCI in the at least two pieces of DCI based on the configuration group identifiers.

The uplink resource indicated by the last piece of DCI is used to carry feedback information of the PDSCH reception occasion scheduled by each piece of DCI.

A rule of determining the last piece of DCI may be:

1. When the network device configures one cell for the terminal device, preferably, there are two different solutions: a solution 1 and a solution 2.

Solution 1: A method for determining the last piece of DCI is as follows: The terminal device first sorts configuration group identifier values in ascending order, and determines a configuration group identifier corresponding to the largest configuration group identifier value. The terminal device determines the latest PDCCH monitoring occasion in PDCCH monitoring occasions corresponding to the configuration group identifier, and determines the last piece of DCI in DCI detected on the latest PDCCH monitoring occasion. The terminal device sorts the PDCCH monitoring occasions in a sequence of start symbol positions of the PDCCH monitoring occasions, and a PDCCH monitoring occasion with the latest start symbol position is the latest PDCCH monitoring occasion.

Solution 2: A method for determining the last piece of DCI is as follows: The terminal device first sorts PDCCH monitoring occasions in ascending order, determines the latest PDCCH monitoring occasion, and determines the last piece of DCI based on configuration group identifier values that correspond to DCI detected on the latest PDCCH monitoring occasion and that are sorted in ascending order.

For further descriptions of the solution 1 and the solution 2, refer to the rule 1 for determining the last piece of DCI in the joint feedback manner in the foregoing embodiment corresponding to FIG. 2. Details are not described herein again.

2. When the network device configures a plurality of cells for the terminal device and the plurality of cells can simultaneously serve the terminal device, different DCI may be sent to the terminal device in different cells. The last piece of DCI is determined based on different sorting combinations of the PDCCH monitoring occasion, the cell identifier, and the configuration group identifier. Preferably, there are six different solutions: a solution 1, a solution 2, a solution 3, a solution 4, a solution 5, and a solution 6.

Solution 1: The last piece of DCI is determined as follows: The terminal device first sorts configuration group identifier values in ascending order, and determines a configuration group identifier corresponding to the largest configuration group identifier value. The terminal device determines the latest PDCCH monitoring occasion in PDCCH monitoring occasions corresponding to the configuration group identifier. In DCI detected on the latest PDCCH monitoring occasion, the terminal device then sorts the DCI based on corresponding cell identifier values, and determines DCI corresponding to the largest cell identifier value as the last piece of DCI.

Solution 2: The last piece of DCI is determined as follows: The terminal device first sorts configuration group identifier values in ascending order, and determines a configuration group identifier corresponding to the largest configuration group identifier value. The terminal device first sorts, based on cell identifier values, DCI corresponding to the configuration group identifier, and determines DCI corresponding to the largest cell identifier value. The terminal device then sorts PDCCH monitoring occasions on which the determined DCI is located, and determines DCI detected on the latest PDCCH monitoring occasion as the last piece of DCI corresponding to the configuration group identifier.

Solution 3: The last piece of DCI is determined as follows: The terminal device first sorts PDCCH monitoring occasions in ascending order, and determines the latest PDCCH monitoring occasion. The terminal device then detects DCI on the latest PDCCH monitoring occasion, and determines, in ascending order of cell identifier values, DCI corresponding to the largest cell identifier value. The terminal device finally determines, based on configuration group identifier values that correspond to the DCI and that are sorted in ascending order, DCI corresponding to the largest configuration group identifier value as the last piece of DCI.

Solution 4: The last piece of DCI is determined as follows: The terminal device first sorts PDCCH monitoring occasions in ascending order, and determines the latest PDCCH monitoring occasion. The terminal device then sorts, in ascending order of configuration group identifier values corresponding to DCI, the DCI detected on the latest PDCCH monitoring occasion, and determines DCI corresponding to the largest configuration group identifier value. The terminal device finally sorts the DCI in ascending order of cell identifier values, and determines DCI corresponding to the largest cell identifier value as the last piece of DCI.

Solution 5: The last piece of DCI is determined as follows: The terminal device first sorts DCI in ascending order of cell identifier values, and determines DCI corresponding to the largest cell identifier value. The terminal device then sorts PDCCH monitoring occasions corresponding to the cell in ascending order, and determines the latest PDCCH monitoring occasion. The terminal device finally sorts, in ascending order of configuration group identifier values corresponding to DCI, the DCI detected on the latest PDCCH monitoring occasion, and determines DCI corresponding to the largest configuration group identifier value as the last piece of DCI.

Solution 6: The last piece of DCI is determined as follows: The terminal device first sorts DCI in ascending order of cell identifier values, and determines DCI corresponding to the largest cell identifier value. The terminal device then sorts the DCI in ascending order of configuration group identifier values, and determines DCI corresponding to the largest configuration group identifier value. The terminal device finally sorts, in ascending order, PDCCH monitoring occasions corresponding to the cell, determines the latest PDCCH monitoring occasion, and determines DCI detected on the latest PDCCH monitoring occasion as the last piece of DCI.

For further descriptions of the solution 1 to the solution 6, refer to the rule 2 for determining the last piece of DCI in the joint feedback manner in the foregoing embodiment corresponding to FIG. 2. Details are not described herein again.

It should be noted that the foregoing sorting rule of determining the last piece of DCI is merely an example, and the latest PDCCH monitoring occasion, the largest configuration group identifier, and the cell identifier are not limited. Different conditions may be added or different forms may be used. For example, different from the foregoing example, when the last piece of DCI is determined, the smallest cell identifier value, or the smallest configuration group identifier value may be considered. This is not limited in the present disclosure.

The last piece of DCI is determined based on the configuration group identifier, so that HARQ feedback for downlink data transmission can be implemented during multi-station scheduling.

In a form of a dynamic codebook (to be specific, a size of feedback information dynamically changes with an actual data scheduling status), the terminal device feeds back HARQ-ACK information based on the uplink resource indicated by the DCI in two manners: a separate feedback manner and a joint feedback manner.

The separate feedback manner:

The terminal device receives a plurality of pieces of DCI, indicates K1 values by using the DCI, determines an uplink slot corresponding to PDSCH feedback information transmitted in a downlink slot, and sends, on an uplink resource corresponding to each configuration group identifier, feedback information associated with the configuration group identifier corresponding to the uplink resource. For example, if a configuration group identifier is a CORESET ID and/or a PDCCH config ID, an uplink resource indicated by DCI transmitted on a PDCCH corresponding to the configuration group identifier is an uplink resource corresponding to the configuration group identifier. The uplink resource indicated by the DCI is an uplink resource indicated by the last piece of DCI. Information feedback is performed, and a feedback sequence is sorted based on DAI domain indicators in the DCI. For separate feedback, feedback information corresponding to different TRPs may be fed back to each TRP, or may be fed back to one TRP (for example, a TRP of a primary cell that provides a service for UE). Further optionally, the TRP forwards the feedback information to the TRP corresponding to each piece of feedback information.

That the terminal device determines, based on the indication of the downlink control information DCI, the uplink resource used for uplink transmission includes: The terminal device determines a selected PUCCH resource set based on a quantity of UCI bits, and then selects a PUCCH resource in the determined PUCCH resource set based on a PUCCH resource identifier field in the last piece of DCI. The last piece of DCI is determined based on at least one of cell identifiers, PDCCH monitoring occasions, or configuration group identifiers. For a rule for determining the last piece of DCI, refer to the rule for determining the last piece of DCI in the semi-persistent codebook in the separate feedback manner.

In the dynamic codebook, in the separate feedback manner, a rule of feedback sorting may be:

The terminal device receives configuration group identifiers (for example, two configuration group identifiers: an identifier A and an identifier B) sent by the network device. In a same uplink slot corresponding to the identifier A, feedback information of a PDSCH reception occasion scheduled by using DCI associated with the identifier A is fed back on an uplink resource indicated by the last piece of DCI. The feedback sequence is sorted based on the DAI domain indicators in the DCI. Optionally, the uplink resource includes a symbol position and a frequency domain resource.

For example, PDSCHs fed back in the same uplink slot are scheduled by using DCI (for example, three pieces of DCI: DCI 1, DCI 2, and DCI 3). An uplink time-frequency resource 1 corresponding to a PDSCH 1 is scheduled by using the DCI 1, and a DAI domain indicator is a DAI 1. An uplink time-frequency resource 2 corresponding to a PDSCH 2 is scheduled by using the DCI 2, and a DAI domain indicator is a DAI 2. An uplink time-frequency resource 3 corresponding to a PDSCH 3 is scheduled by using the DCI 3, and a DAI domain indicator is a DAI 3. It is determined that the DCI 3 is the last piece of DCI in the DCI 1, the DCI 2, and the DCI 3, and it is determined that an uplink time-frequency resource indicated by the last piece of DCI is the uplink time-frequency resource 3. In this case, feedback information of the PDSCHs is fed back on the uplink time-frequency resource 3. When the feedback information of the PDSCHs scheduled by using the DCI indicated by the DAIs is sorted on the uplink resource, the feedback information is sorted based on a DAI number corresponding to the feedback information, and feedback information corresponding to a smaller DAI number is ranked in the front.

Similarly, feedback information of a PDSCH reception occasion corresponding to the identifier B may also be sorted according to the same rule.

A joint feedback manner:

Optionally, that the terminal device determines an uplink resource based on a configuration group identifier, and sends, on the determined uplink resource, feedback information associated with the configuration group identifier corresponding to the uplink resource includes: The terminal device determines, based on the configuration group identifier, the uplink resource for sending the feedback information, and sends the feedback information of a PDSCH reception occasion on the uplink resource. For example, the terminal device determines, based on a value of the configuration group identifier, the uplink resource for sending the feedback information. For example, if the feedback information is sent on a determined uplink resource with a larger configuration group identifier (for example, two configuration group identifiers: an identifier A0 and an identifier A1, where a value of the identifier A1 is greater than a value of the identifier A0), the terminal device sends the feedback information of the PDSCH reception occasion on an uplink resource corresponding to A1.

When uplink resources corresponding to configuration group identifiers completely overlap, joint feedback information is sent to TRPs (for example, two TRPs: a TRP 1 and a TRP 2), and the TRP 1 and the TRP 2 schedule a same uplink resource. In this case, both the TRP 1 and the TRP 2 can receive feedback information that is of a PDSCH reception occasion and that is sent by UE. For example, the TRP 1 and the TRP 2 negotiate to configure, for the UE, the same uplink resource that is used to send the feedback information of the PDSCH reception occasion.

When uplink resources corresponding to configuration group identifiers do not completely overlap, different TRPs (for example, two TRPs: a TRP 1 and a TRP 2) schedule different uplink resources. The TRP 1 corresponds to the configuration group identifier A0, the TRP 2 corresponds to the configuration group identifier A1, and the value of the identifier A1 is greater than the value of the identifier A0. In this case, the joint feedback information is sent to the TRP 2 corresponding to a larger configuration group identifier. The TRP 2 forwards the joint feedback information to the TRP 1, and the TRP 2 is configured to receive the feedback information that is of the PDSCH reception occasion and that is sent by the UE.

That the terminal device determines, based on the indication of the downlink control information DCI, the uplink resource used for uplink transmission includes: The terminal device determines a selected PUCCH resource set based on a quantity of UCI bits, and then selects a PUCCH resource in the determined PUCCH resource set based on a PUCCH resource identifier field in the last piece of DCI. The last piece of DCI is determined based on at least one of cell identifiers, PDCCH monitoring occasions, or configuration group identifiers. For a rule for determining the last piece of DCI, refer to the rule for determining the last piece of DCI in the semi-persistent codebook in the joint feedback manner.

Optionally, the last piece of DCI may be further determined in ascending order of values of DAI domains in the DCI. For example, different pieces of DCI (for example, three pieces of DCI: DCI 0, DCI 1, and DCI 2) correspond to different DAI domains. A DAI domain corresponding to the DCI 0 is a DAI 0, a DAI domain corresponding to the DCI 1 is a DAI 1, and a DAI domain corresponding to the DCI 2 is a DAI 2. Assuming that the DAI 2 is the last DAI value determined in the DAI 0, the DAI 1, and the DAI 2, it is determined that the DCI 2 corresponding to the DAI 2 is the last piece of DCI.

Optionally, the last piece of DCI may be further determined by preferentially determining a configuration group identifier. For example, the last piece of DCI is included in DCI corresponding to a configuration group identifier with a larger configuration group identifier value. In the DCI corresponding to the configuration group identifier, a value relationship between values of DAI domains in the DCI is used to determine the last piece of DCI.

In the dynamic codebook, in the joint feedback manner, a rule of feedback sorting may be:

The terminal device receives configuration group identifiers (for example, two configuration group identifiers: an identifier A and an identifier B) sent by the network device. Feedback information of a PDSCH reception occasion scheduled by using DCI associated with the identifier A and feedback information of a PDSCH reception occasion scheduled by using DCI associated with the identifier B are fed back on an uplink resource indicated by the last piece of DCI. The feedback sequence is sorted based on the DAI domain indicators in the DCI. Optionally, the uplink resource includes a symbol position and a frequency domain resource.

For example, PDSCHs fed back in the same uplink slot are scheduled by using DCI (for example, three pieces of DCI: DCI 1, DCI 2, and DCI 3). An uplink time-frequency resource 1 corresponding to a PDSCH 1 is scheduled by using the DCI 1, and a DAI domain indicator is a DAI 1. An uplink time-frequency resource 2 corresponding to a PDSCH 2 is scheduled by using the DCI 2, and a DAI domain indicator is a DAI 2. An uplink time-frequency resource 3 corresponding to a PDSCH 3 is scheduled by using the DCI 3, and a DAI domain indicator is a DAI 3. It is determined that the DCI 3 is the last piece of DCI in the DCI 1, the DCI 2, and the DCI 3, and it is determined that an uplink time-frequency resource indicated by the last piece of DCI is the uplink time-frequency resource 3. In this case, feedback information of the PDSCHs is fed back on the uplink time-frequency resource 3. When the feedback information of the PDSCHs scheduled by using the DCI indicated by the DAIs is sorted on the uplink resource, the feedback information is sorted based on a DAI number corresponding to the feedback information, and feedback information corresponding to a smaller DAI number is ranked in the front.

The methods provided in the embodiments of this disclosure are described above in detail with reference to FIG. 2 to FIG. 4. The following describes in detail a communications apparatus provided in the embodiments of this disclosure with reference to FIG. 5.

Figure 5:
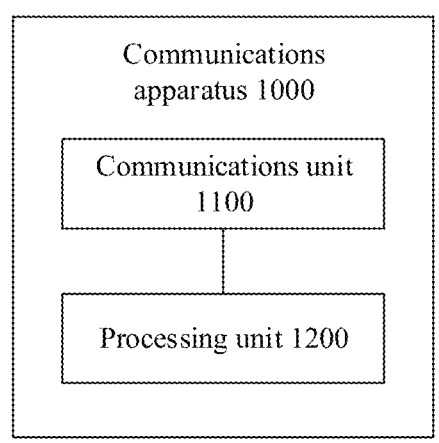
FIG. 5 is a schematic block diagram of a communications apparatus according to an embodiment of this disclosure.

FIG. 5 is a schematic block diagram of a communications apparatus according to an embodiment of this disclosure. As shown in the figure, the communications apparatus 1000 may include a communications unit 1100 and a processing unit 1200.

In a possible design, the communications apparatus 1000 may correspond to the terminal device in the foregoing method embodiments, for example, may be a terminal device, or may be a chip disposed in a terminal device.

Specifically, the communications apparatus 1000 may correspond to the terminal device in the method 200 in the embodiments of this disclosure and/or the method 400 in the embodiments of this disclosure, and the communications apparatus 1000 may include units configured to perform the method performed by the terminal device in the method 200 in FIG. 2 and/or the method 400 in FIG. 4. In addition, the units in the communications apparatus 1000 and the foregoing other operations and/or functions are separately intended to implement corresponding procedures of the method 200 in FIG. 2 and/or the method 400 in FIG. 4.

When the communications apparatus 1000 is configured to perform the method 200 in FIG. 2, the communications unit 1100 may be configured to perform operation 210 and operation 230 in the method 200, and the processing unit 1200 may be configured to perform the method 200.

When the communications apparatus 1000 is configured to perform the method 400 in FIG. 4, the communications unit 1100 may be configured to perform operation 410 and operation 420 in the method 400, and the processing unit 1200 may be configured to perform the method 430. It should be understood that a specific process in which each unit performs the foregoing corresponding operations is described in detail in the foregoing method embodiments, and for brevity, details are not described herein again.

Figure 7:
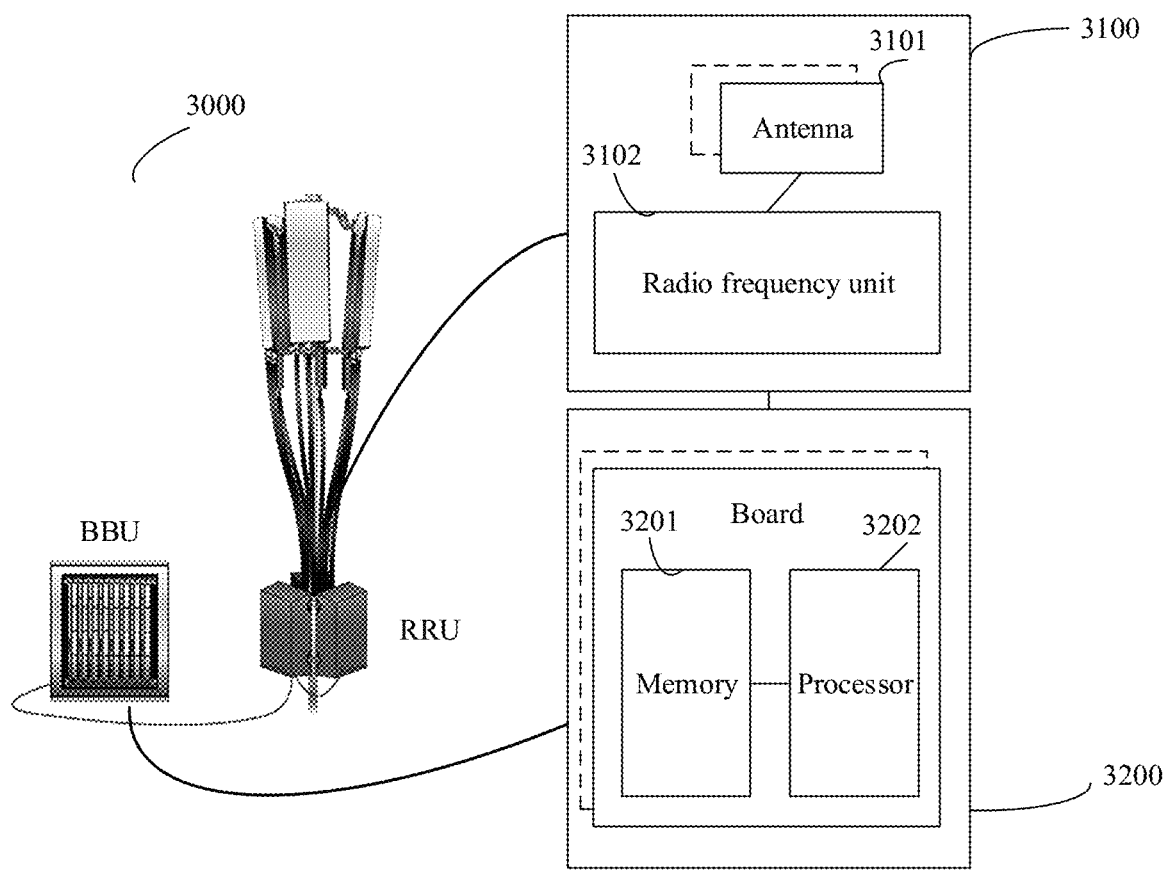
FIG. 7 is a schematic structural diagram of a network device according to an embodiment of this disclosure.

It should be further understood that when the communications apparatus 1000 is a network device, a communications unit in the communications apparatus 1000 may correspond to a transceiver 3200 in a network device 3000 shown in FIG. 7, and the processing unit 1200 in the communications apparatus 1000 may correspond to a processor 3100 in the network device 3000 shown in FIG. 7.

It should be further understood that when the communications apparatus 1000 is a chip disposed in a network device, the communications unit 1100 in the communications apparatus 1000 may be an input/output interface.

Figure 6:
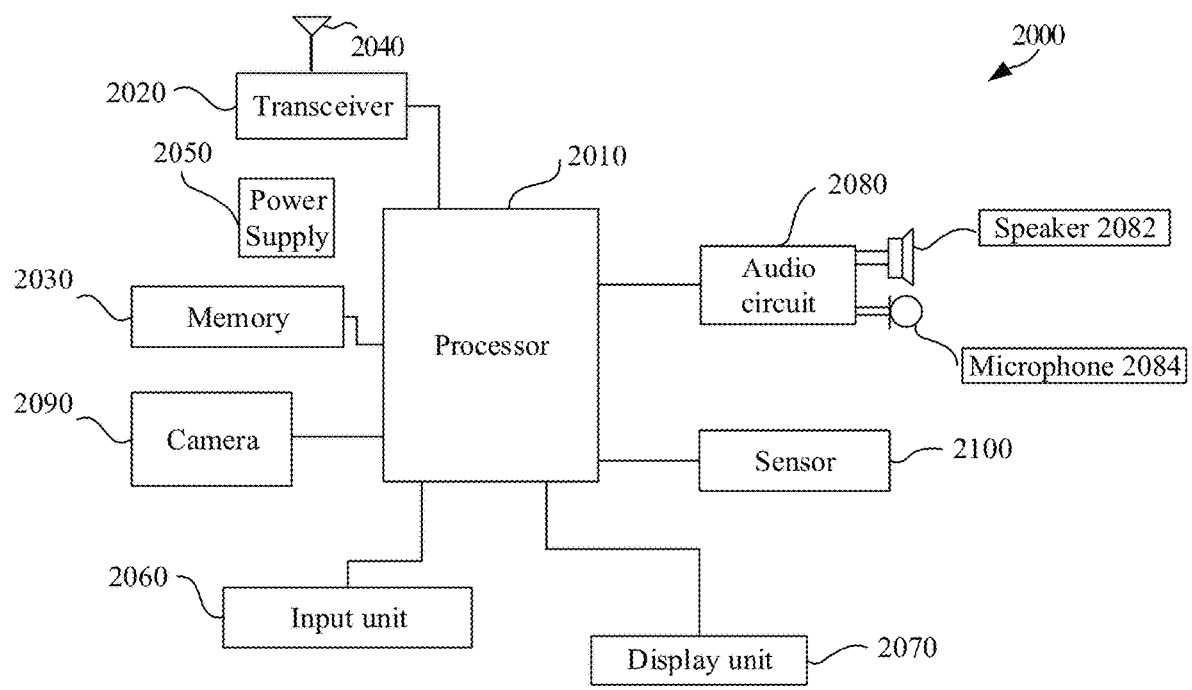
FIG. 6 is a schematic structural diagram of a terminal device according to an embodiment of this disclosure.

FIG. 6 is a schematic structural diagram of a terminal device 2000 according to an embodiment of this disclosure. The terminal device 2000 may be used in the system shown in FIG. 1, to perform functions of the terminal device in the foregoing method embodiments.

As shown in FIG. 6, the terminal device 2000 includes a processor 2010 and a transceiver 2020. Optionally, the terminal device 2000 further includes a memory 2030. The processor 2010, the transceiver 2020, and the memory 2030 may communicate with each other through an internal connection path, to transfer a control signal and/or a data signal. The memory 2030 is configured to store a computer program. The processor 2010 is configured to invoke the computer program from the memory 2030 and run the computer program, to control the transceiver 2020 to send and receive a signal. Optionally, the terminal device 2000 may further include an antenna 2040, configured to send, by using a radio signal, uplink data or uplink control signaling output by the transceiver 2020.

The processor 2010 and the memory 2030 may be integrated into one processing apparatus. The processor 2010 is configured to execute program code stored in the memory 2030 to implement the foregoing functions. During specific implementation, the memory 2030 may also be integrated into the processor 2010, or may be independent of the processor 2010. The processor 2010 may correspond to the processing unit in FIG. 5.

The transceiver 2020 may correspond to the communications unit in FIG. 5, and may also be referred to as a transceiver unit. The transceiver 2020 may include a receiver (or referred to as a receiver or a receiver circuit) and a transmitter (or referred to as a transmitter or a transmitter circuit). The receiver is configured to receive a signal, and the transmitter is configured to transmit a signal.

It should be understood that the terminal device 2000 shown in FIG. 6 can implement the processes related to the terminal device in the method embodiment shown in FIG. 2 and/or the method embodiment shown in FIG. 4. Operations and/or functions of modules in the terminal device 2000 are intended to implement corresponding procedures in the foregoing method embodiments. For details, refer to the descriptions in the foregoing method embodiments. To avoid repetition, detailed descriptions are properly omitted herein.

The processor 2010 may be configured to perform an action that is implemented inside the terminal device and that is described in the foregoing method embodiments, and the transceiver 2020 may be configured to perform an action of receiving or sending that is performed by the terminal device from or to the network device and that is described in the foregoing method embodiments. For details, refer to the descriptions in the foregoing method embodiments. Details are not described herein again.

Optionally, the terminal device 2000 may further include a power supply 2050 that is configured to supply power to various devices or circuits in the terminal device.

In addition, to improve functions of the terminal device, the terminal device 2000 may further include one or more of an input unit 2060, a display unit 2070, an audio circuit 2080, a camera 2090, a sensor 2100, and the like, and the audio circuit may further include a loudspeaker 2082, a microphone 2084, and the like.

FIG. 7 is a schematic structural diagram of a network device according to an embodiment of this disclosure, for example, may be a schematic structural diagram of a base station. The base station 3000 may be used in the system shown in FIG. 1, to perform functions of the network device in the foregoing method embodiments.

As shown in FIG. 7, the base station 3000 may include one or more radio frequency units, such as a remote radio unit (RRU) 3100 and one or more baseband units (BBU) (which may also be referred to as digital units, digital unit, DU) 3200. The RRU 3100 may be referred to as a transceiver unit, and corresponds to the communications unit 1100 in FIG. 5. Optionally, the transceiver unit 3100 may also be referred to as a transceiver machine, a transceiver circuit, a transceiver, or the like, and may include at least one antenna 3101 and a radio frequency unit 3102. Optionally, the transceiver unit 3100 may include a receiving unit and a sending unit. The receiving unit may correspond to a receiver (or referred to as a receiver or a receiver circuit), and the sending unit may correspond to a transmitter (or referred to as a transmitter or a transmitter circuit). The RRU 3100 is mainly configured to: receive and send a radio frequency signal, and perform conversion between the radio frequency signal and a baseband signal. For example, the RRU 3100 is configured to send indication information to a terminal device. The BBU 3200 is mainly configured to: perform baseband processing, control the base station, and the like. The RRU 3100 and the BBU 3200 may be physically disposed together, or may be physically disposed separately; to be specific, the base station is a distributed base station.

The BBU 3200 is a control center of the base station, may be referred to as a processing unit, may correspond to the processing unit 1200 in FIG. 5, and is mainly configured to implement a baseband processing function, for example, channel coding, multiplexing, modulation, or spreading. For example, the BBU (the processing unit) may be configured to control the base station to perform an operation procedure related to the network device in the foregoing method embodiments, for example, to generate the foregoing indication information.

In an example, the BBU 3200 may include one or more boards, and a plurality of boards may jointly support a radio access network (such as an LTE network) having a single access standard, or may separately support radio access networks (such as an LTE network, a 5G network, or another network) having different access standards. The BBU 3200 further includes a memory 3201 and a processor 3202. The memory 3201 is configured to store a necessary instruction and necessary data. The processor 3202 is configured to control the base station to perform a necessary action, for example, configured to control the base station to perform the operation procedure of the network device in the foregoing method embodiments. The memory 3201 and the processor 3202 may serve one or more boards. That is, the memory and the processor may be independently disposed on each board. Alternatively, a plurality of boards may share a same memory and a same processor. In addition, each board may further be provided with a necessary circuit.

It should be understood that the base station 3000 shown in FIG. 7 can implement processes related to the network device in the method embodiment in FIG. 2 and/or the method embodiment in FIG. 4. Operations and/or functions of modules in the base station 3000 are intended to implement corresponding procedures in the foregoing method embodiments. For details, refer to the descriptions in the foregoing method embodiments. To avoid repetition, detailed descriptions are properly omitted herein.

The BBU 3200 may be configured to perform an action that is implemented inside the network device and that is described in the foregoing method embodiments, and the RRU 3100 may be configured to perform an action of receiving or sending that is performed by the network device from or to the terminal device and that is described in the foregoing method embodiments. For details, refer to the descriptions in the foregoing method embodiments. Details are not described herein again.

An embodiment of this disclosure further provides a processing apparatus, including a processor and an interface. The processor is configured to perform the communication methods in the foregoing method embodiments.

It should be understood that, the processing apparatus may be a chip. For example, the processing apparatus may be a field programmable gate array (FPGA), an disclosure-specific integrated chip (ASIC), a system on chip (SoC), a central processing unit (CPU), a network processor (NP), a digital signal processing circuit (DSP), a microcontroller unit (MCU), a programmable controller (PLD), or another integrated chip.

In an implementation process, operations in the foregoing methods may be implemented by using a hardware integrated logic circuit in the processor, or by using instructions in a form of software. The operations in the methods disclosed with reference to the embodiments of this disclosure may be directly performed and completed through a hardware processor, or may be performed and completed through a combination of hardware and a software module that are in the processor. The software module may be located in a mature storage medium in the art, for example, a random access memory, a flash memory, a read-only memory, a programmable read-only memory, an electrically erasable programmable memory, or a register. The storage medium is located in a memory, and the processor reads information in the memory and completes the operations in the foregoing methods in combination with hardware of the processor. To avoid repetition, details are not described herein again.

It should be noted that, the processor in the embodiments of this disclosure may be an integrated circuit chip, and has a signal processing capability. In an implementation process, the operations in the foregoing method embodiments may be implemented by using the hardware integrated logic circuit in the processor, or by using the instruction in the form of software. The processor may be a general-purpose processor, a digital signal processor (DSP), an disclosure-specific integrated circuit (ASIC), a field programmable gate array (FPGA) or another programmable logic device, a discrete gate or a transistor logic device, or a discrete hardware component. The processor may implement or perform the methods, operations, and logical block diagrams that are disclosed in the embodiments of this disclosure. The general-purpose processor may be a microprocessor, or the processor may be any conventional processor or the like. The operations in the methods disclosed with reference to the embodiments of this disclosure may be directly performed and completed through a hardware decoding processor, or may be performed and completed through a combination of hardware and a software module that are in a decoding processor. The software module may be located in the mature storage medium in the art, for example, the random access memory, the flash memory, the read-only memory, the programmable read-only memory, the electrically erasable programmable memory, or the register. The storage medium is located in the memory, and the processor reads the information in the memory and completes the operations in the foregoing methods in combination with hardware of the processor.

It may be understood that the memory in the embodiments of this disclosure may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory of the systems and methods described in this specification includes but is not limited to these memories and any memory of another proper type.

According to the methods provided in the embodiments of this disclosure, this disclosure further provides a computer program product. The computer program product includes computer program code. When the computer program code is run on a computer, the computer is enabled to perform the method in any one of the embodiment shown in FIG. 2 and/or the embodiment shown in FIG. 4.

According to the methods provided in the embodiments of this disclosure, this disclosure further provides a computer-readable medium. The computer-readable medium stores program code. When the program code is run on a computer, the computer is enabled to perform the method in any one of the embodiment shown in FIG. 2 and/or the embodiment shown in FIG. 4.

According to the methods provided in the embodiments of this disclosure, this disclosure further provides a system. The system includes the foregoing one or more terminal devices and one or more network devices.

All or some of the foregoing embodiments may be implemented by software, hardware, firmware, or any combination thereof. When the software is used to implement the embodiments, the embodiments may be implemented completely or partially in a form of a computer program product. The computer program product includes one or more computer instructions. When the computer instructions are loaded and executed on a computer, the procedures or functions according to the embodiments of this disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (such as a floppy disk, a hard disk, or a magnetic tape), an optical medium (such as a high-density digital video disc (DVD)), a semiconductor medium (such as a solid-state drive (SSD)), or the like.

The network device and the terminal device in the foregoing apparatus embodiments completely correspond to the network device and the terminal device in the method embodiments. A corresponding module or unit performs a corresponding operation. For example, the communications unit (transceiver) performs a sending operation or a receiving operation in the method embodiments, and the processing unit (processor) performs another operation other than the sending operation and the receiving operation. For a function of a specific unit, refer to corresponding method embodiments. There may be one or more processors.

The terms such as "component", "module", and "system" used in this specification are used to indicate computer-related entities, hardware, firmware, combinations of hardware and software, software, or software being executed. For example, a component may be, but is not limited to, a process that is run on a processor, a processor, an object, an executable file, an execution thread, a program, and/or a computer. As shown in figures, both a computing device and an disclosure that runs on a computing device may be components. One or more components may reside within a process and/or an execution thread, and a component may be located on one computer and/or distributed between two or more computers. In addition, these components may be executed from various computer-readable media that store various data structures. For example, the components may communicate by using a local and/or remote process and according to a signal having one or more data packets (for example, data from two components interacting with another component in a local system, a distributed system, and/or across a network such as the interne interacting with another system by using a signal).

A person of ordinary skill in the art may be aware that, with reference to the embodiments disclosed in this specification, illustrative logical blocks (illustrative logical block) and operations (operation) may be implemented by electronic hardware or a combination of computer software and electronic hardware. Whether the functions are performed by hardware or software depends on particular disclosures and design constraints of the technical solutions. A person skilled in the art may use different methods to implement the described functions for each particular disclosure, but it should not be considered that the implementation goes beyond the scope of this disclosure.

It may be clearly understood by a person skilled in the art that, for the purpose of convenient and brief description, for detailed working processes of the foregoing system, apparatus, and unit, refer to corresponding processes in the foregoing method embodiments, and details are not described herein again.

In the several embodiments provided in this disclosure, it should be understood that the disclosed system, apparatuses, and methods may be implemented in other manners. For example, the described apparatus embodiments are merely examples. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or in another form.

The units described as separate parts may or may not be physically separate, and parts displayed as units may or may not be physical units, to be specific, may be located in one position, or may be distributed on a plurality of network units. Some or all of the units may be selected based on an actual requirement to achieve the objectives of the solutions of the embodiments.

In addition, functional units in the embodiments of this disclosure may be integrated into one processing unit, or each of the units may exist alone physically, or two or more units are integrated into one unit.

In the foregoing embodiments, all or some of functions of the functional units may be implemented by software, hardware, firmware, or any combination thereof. When the software is used to implement the embodiments, the embodiments may be implemented completely or partially in a form of a computer program product. The computer program product includes one or more computer instructions (programs). When the computer program instructions (programs) are loaded and executed on a computer, the procedures or functions according to the embodiments of this disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

When the functions are implemented in a form of a software functional unit and sold or used as an independent product, the functions may be stored in a computer-readable storage medium. Based on such an understanding, the technical solutions of this disclosure essentially, or the part contributing to the conventional technology, or some of the technical solutions may be implemented in a form of a software product. The software product is stored in a storage medium, and includes several instructions for instructing a computer device (which may be a personal computer, a server, a network device, or the like) to perform all or some of the operations in the methods described in the embodiments of this disclosure. The foregoing storage medium includes: any medium that can store program code, for example, a USB flash drive, a removable hard disk, a read-only memory (ROM), a random access memory (RAM), a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of the claims.

What is claimed is:

1. A communication method performed by a communication apparatus, the method comprising:
   receiving a plurality of configuration group identifiers;
   determining a plurality of physical downlink shared channel (PDSCH) reception occasions corresponding to the plurality of configuration group identifiers; and
   transmitting feedback information of the plurality of PDSCH reception occasions based on each configuration group identifier corresponding to each of the plurality of PDSCH reception occasions and according to a predetermined rule of feedback sorting; wherein
   the transmitting feedback information of the plurality of PDSCH reception occasions comprises:
   determining an uplink resource based on the configuration group identifiers; and
   transmitting, on the determined uplink resource, feedback information of the plurality of PDSCH reception occasions corresponding to the plurality of configuration group identifiers, wherein the uplink resource is determined based on a last downlink control information (DCI) in a plurality of DCIs corresponding to the plurality of configuration group identifiers, wherein the last DCI is determined based on physical downlink control channel (PDCCH) monitoring occasions, configuration group identifiers and cell identifiers as follows:
      for a plurality of cell identifiers corresponding to detected DCIs, determining first DCIs corresponding to a largest cell identifier value;
      for a plurality of PDCCH monitoring occasions corresponding to a cell with the largest cell identifier value, determining second DCIs corresponding to a latest PDCCH monitoring occasion from the first DCIs; and
      for a plurality of configuration group identifiers corresponding to the latest PDCCH monitoring occasion, determining the last DCI corresponding to a largest configuration group identifier value from the second DCIs.

2. The communication method according to claim 1, wherein the configuration group identifier is at least one of the following: an identifier (ID) or an index of a slot time sequence set, an ID or an index of a control resource set (CORESET), an ID or an index of a control resource set group CORESET group, an ID or an index of a PDCCH configuration, or an index of a higher layer parameter.

3. The communication method according to claim 1, wherein the predetermined rule of feedback sorting comprises sorting based on at least one of: a number of a time domain unit in which the PDSCH reception occasion is located, a quantity of the configuration group identifier, or a quantity of a cell identifier corresponding to the PDSCH reception occasion.

4. The communication method according to claim 3, comprising:
   ranking feedback information of a PDSCH reception occasion with a smaller configuration group identifier prior to feedback information of a PDSCH reception occasion with a larger configuration group identifier.

5. The communication method according to claim 4, comprising:
ranking feedback information of a PDSCH reception occasion with a smaller cell identifier prior to feedback information of a PDSCH reception occasion with a larger cell identifier, wherein the cell identifier corresponds to the configuration group identifier.

6. The communication method according to claim 5, comprising:
ranking feedback information of a PDSCH reception occasion with a smaller number of a time domain unit prior to feedback information of a PDSCH reception occasion with a larger number of a time domain unit, wherein the time domain unit corresponds to the cell identifier.

7. A communications apparatus, comprising:
at least one processor;
configured with processor-executable instructions to perform operations comprising:
receiving a plurality of configuration group identifiers;
determining a plurality of physical downlink shared channel (PDSCH) reception occasions corresponding to the plurality of configuration group identifiers, and
transmitting feedback information of the plurality of PDSCH reception occasions based on each configuration group identifier corresponding to each of the plurality of PDSCH reception occasions and according to a predetermined rule of feedback sorting, wherein the transmitting feedback information of the plurality of PDSCH reception occasions comprises:
determining an uplink resource based on the plurality of configuration group identifiers; and
transmitting, on the determined uplink resource, feedback information of the plurality of PDSCH reception occasions corresponding to the plurality of configuration group identifiers, wherein the uplink resource is determined based on a last downlink control information (DCI) in a plurality of DCIs corresponding to the plurality of configuration group identifiers, wherein the last DCI is determined based on physical downlink control channel (PDCCH) monitoring occasions, configuration group identifiers and cell identifiers as follows:
for a plurality of cell identifiers corresponding to detected DCIs, determining first DCIs corresponding to a largest cell identifier value;
for a plurality of PDCCH monitoring occasions corresponding to a cell with the largest cell identifier value, determining second DCIs corresponding to a latest PDCCH monitoring occasion from the first DCIs; and
for a plurality of configuration group identifiers corresponding to the latest PDCCH monitoring occasion, determining the last DCI corresponding to a largest configuration group identifier value from the second DCIs.

8. The communications apparatus according to claim 7, wherein the configuration group identifier comprises at least one of: an identifier (ID) or an index of a slot time sequence set, an ID or an index of a control resource set (CORESET), an ID or an index of a control resource set group CORESET group, an ID or an index of a PDCCH configuration, or an index of a higher layer parameter.

9. The communications apparatus according to claim 7, wherein the predetermined rule of the feedback sorting comprises sorting based on at least one of: a number of a time domain unit in which the PDSCH reception occasion is located, a quantity of the configuration group identifier, or a quantity of a cell identifier corresponding to the PDSCH reception occasion.

10. The communications apparatus according to claim 9, wherein the at least one processor is further configured with processor-executable instructions to perform operations comprising:
ranking feedback information of a PDSCH reception occasion with a smaller configuration group identifier prior to feedback information of a PDSCH reception occasion with a larger configuration group identifier.

11. The communications apparatus according to claim 10, wherein the at least one processor is further configured with processor-executable instructions to perform operations comprising:
ranking feedback information of a PDSCH reception occasion with a smaller cell identifier prior to feedback information of a PDSCH reception occasion with a larger cell identifier, wherein the cell identifier corresponds to the configuration group identifier.

12. The communications apparatus according to claim 11, wherein the at least one processor is further configured with processor-executable instructions to perform operations comprising:
ranking feedback information of a PDSCH reception occasion with a smaller number of a time domain unit prior to feedback information of a PDSCH reception occasion with a larger number of a time domain unit, wherein the time domain unit corresponds to the cell identifier.

13. A non-transitory computer-readable storage medium comprising a computer program, wherein when the computer program is run on a computer, the computer is enabled to perform operations comprising:
receiving a plurality of configuration group identifiers;
determining a plurality of physical downlink shared channel (PDSCH) reception occasions corresponding to the plurality of configuration group identifiers, and
transmitting feedback information of the plurality of PDSCH reception occasions based on each configuration group identifier corresponding to each of the plurality of PDSCH reception occasions and according to a predetermined rule of feedback sorting, wherein the transmitting feedback information of the plurality of PDSCH reception occasions comprises:
determining an uplink resource based on the plurality of configuration group identifiers; and
transmitting, on the determined uplink resource, feedback information of the plurality of PDSCH reception occasions corresponding to the plurality of configuration group identifiers, wherein the uplink resource is determined based on a last downlink control information (DCI) in a plurality of DCIs corresponding to the plurality of configuration group identifiers, wherein the last DCI is determined based on physical downlink control channel (PDCCH) monitoring occasions, configuration group identifiers and cell identifiers as follows:
for a plurality of cell identifiers corresponding to detected DCIs, determining first DCIs corresponding to a largest cell identifier value;
for a plurality of PDCCH monitoring occasions corresponding to a cell with the largest cell identifier value, determining second DCIs corresponding to a latest PDCCH monitoring occasion from the first DCIs; and for a plurality of configuration group identifiers corresponding to the latest PDCCH monitoring occasion, determining the last DCI corresponding to a largest configuration group identifier value from the second DCIs.

14. The non-transitory computer-readable storage medium according to claim 13, wherein the configuration group identifier is at least one of: an identifier (ID) or an index of a slot time sequence set, an ID or an index of a control resource set (CORESET), an ID or an index of a control resource set group CORESET group, an ID or an index of a PDCCH configuration, or an index of a higher layer parameter.

15. The non-transitory computer-readable storage medium according to claim 13, wherein the predetermined rule of feedback sorting comprises sorting based on at least one of: a number of a time domain unit in which the PDSCH reception occasion is located, a quantity of the configuration group identifier, or a quantity of a cell identifier corresponding to the PDSCH reception occasion.

16. The non-transitory computer-readable storage medium according to claim 15, wherein when the computer program is run on a computer, the computer is further enabled to perform operations comprising:

feedback information of a PDSCH reception occasion with a smaller configuration group identifier is ranked before feedback information of a PDSCH reception occasion with a larger configuration group identifier.

17. The non-transitory computer-readable storage medium according to claim 16, wherein when the computer program is run on a computer, the computer is further enabled to perform operations comprising:

feedback information of a PDSCH reception occasion with a smaller cell identifier is ranked before feedback information of a PDSCH reception occasion with a larger cell identifier, wherein the cell identifier corresponds to the configuration group identifier.

18. The non-transitory computer-readable storage medium according to claim 17, wherein when the computer program is run on a computer, the computer is further enabled to perform operations comprising:

feedback information of a PDSCH reception occasion with a smaller number of a time domain unit is ranked before feedback information of a PDSCH reception occasion with a larger number of a time domain unit, wherein the time domain unit corresponds to the cell identifier.

* * * * *